(12) United States Patent
Vlasceanu et al.

(10) Patent No.: US 12,379,948 B1
(45) Date of Patent: Aug. 5, 2025

(54) UNIFIED AGENTIC AUTOMATION AND ROBOTIC PROCESS AUTOMATION WITH SELF-HEALING AND CAPABILITIES TO INCREASE AUTONOMY

(71) Applicant: UiPath, Inc., New York, NY (US)

(72) Inventors: Victor Vlasceanu, Bucharest (RO); Andrei Neculaesei, Bucharest (RO); Silviu Georgescu, Craiova (RO); Taqi Jaffri, Kirkland, WA (US); Venkata Syam Prakash Rapaka, Cupertino, CA (US)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 19/006,505

(22) Filed: Dec. 31, 2024

Related U.S. Application Data

(60) Provisional application No. 63/710,542, filed on Oct. 22, 2024.

(51) Int. Cl.
  *G06F 9/451* (2018.01)
  *G06F 16/3329* (2025.01)

(52) U.S. Cl.
  CPC .......... *G06F 9/453* (2018.02); *G06F 16/3329* (2019.01)

(58) Field of Classification Search
  CPC ............................................... G06Q 10/06311
  See application file for complete search history.

(56) References Cited

U.S. PATENT DOCUMENTS

| | | |
|---|---|---|
| 10,654,166 B1 | 5/2020 | Hall |
| 10,860,905 B1 | 12/2020 | Gligan et al. |
| 10,970,109 B1 | 4/2021 | Berenstein et al. |
| 10,990,876 B1 | 4/2021 | Neagovici et al. |
| 11,080,548 B1 | 8/2021 | Skarda |
| 11,113,095 B2 | 9/2021 | Krishnamurthy et al. |
| 11,416,740 B2 | 8/2022 | Nokbak Nyembe et al. |
| 11,507,259 B2 | 11/2022 | Dines |
| 11,550,549 B2 | 1/2023 | Thangaraj et al. |
| 11,571,811 B2 | 2/2023 | Singh et al. |

(Continued)

FOREIGN PATENT DOCUMENTS

| | | | |
|---|---|---|---|
| CN | 106453551 B | * 4/2019 | ............ B25J 9/1679 |
| CN | 118691231 A | 9/2024 | |

(Continued)

OTHER PUBLICATIONS

"Agentic AI in Automation: The Next Generation of Autonomous Intelligence", Accelirate, https://www.accelirate.com/agentic-ai/.

(Continued)

*Primary Examiner* — Di Xiao
(74) *Attorney, Agent, or Firm* — LeonardPatel PC; Michael A. Leonard, II; Sheetal S. Patel

(57) ABSTRACT

Unified solutions for agentic automation and robotic process automation (RPA) with self-healing and capabilities to increase autonomy are disclosed. AI agents "coexist" in tandem with RPA robots that execute RPA automations. The AI agents can dynamically leverage the tools available via these RPA robots to perform document processing, user interface (UI) automation, semantic copy-and-paste between a source and a target, etc. AI agents can dynamically select these tools and execute them in the form of a pipeline.

25 Claims, 19 Drawing Sheets

(56) References Cited

U.S. PATENT DOCUMENTS

| | | | |
|---|---|---|---|
| 11,614,730 B2 | 3/2023 | Amin et al. | |
| 11,733,668 B2 | 8/2023 | Hall | |
| 11,738,453 B2 | 8/2023 | Shrivastava et al. | |
| 11,748,069 B2 | 9/2023 | Grigore | |
| 11,748,479 B2 | 9/2023 | Seth | |
| 11,915,041 B1 | 2/2024 | Tanach et al. | |
| 11,966,825 B2 | 4/2024 | Arcand et al. | |
| 12,124,806 B2 | 10/2024 | Mayer et al. | |
| 12,147,881 B2 | 11/2024 | Dines | |
| 2021/0097274 A1 | 4/2021 | Gligan et al. | |
| 2022/0011732 A1 | 1/2022 | Hall | |
| 2022/0036302 A1 | 2/2022 | Cella et al. | |
| 2022/0051136 A1 | 2/2022 | Côté et al. | |
| 2022/0150106 A1* | 5/2022 | McTaggart | H04L 41/5009 |
| 2022/0300336 A1 | 9/2022 | Major et al. | |
| 2022/0328164 A1 | 10/2022 | Rogers et al. | |
| 2023/0107316 A1 | 4/2023 | Ripa et al. | |
| 2023/0415338 A1 | 12/2023 | Dines | |
| 2023/0421443 A1 | 12/2023 | Pirinen et al. | |
| 2024/0001553 A1* | 1/2024 | Chen | B25J 13/085 |
| 2024/0210903 A1 | 6/2024 | Iordan et al. | |
| 2024/0220581 A1 | 7/2024 | Dines et al. | |
| 2024/0303443 A1 | 9/2024 | Cheng et al. | |
| 2024/0338248 A1* | 10/2024 | Bose | G06F 9/451 |
| 2024/0370764 A1 | 11/2024 | Goyal et al. | |
| 2024/0419950 A1 | 12/2024 | Tong et al. | |
| 2024/0427631 A1* | 12/2024 | Corlatescu | G06F 9/54 |
| 2025/0173330 A1 | 5/2025 | Durg et al. | |

FOREIGN PATENT DOCUMENTS

| | | |
|---|---|---|
| CN | 118819775 A | 10/2024 |
| WO | 2020223371 A1 | 11/2020 |
| WO | 2024025863 A1 | 2/2024 |

OTHER PUBLICATIONS

"RPA Project: Process Definition Document—A Comprehensive Guide," available at https://medium.com/@subhamchand200/rpa-project-process-definition-document-a-comprehensive-guide-d6a894a07695 (Oct. 14, 2024).

Adrian White, "LLM Function Calling: When LLMs Call Other LLMs", Medium, https://medium.com/@adrian.white/llm-function-calling-when-llms-call-other-llms-940c43885639.

Ajoy Kumar, "Architectural Approach for Building Generative AI Applications," available at https://www.bmc.com/blogs/architectural-approach-for-building-generative-ai-applications/ (Feb. 2, 2024).

Ashish Kumar, "Function Calling in AI Agents Using Mistral 7B", Analytics Vidhya, https://www.analyticsvidhya.com/blog/2024/10/function-calling-in-ai-agents-using-mistral-7b/#~:text=in the scope of Generative, and perform complex.

Automation Anywhere AI Agent Studio Page, available at https://www.automationanywhere.com/products/ai-agent-studio (last accessed Dec. 29, 2024).

Automation Anywhere, "Easily Build AI Agents to Handle Cognitive Tasks", AI Agent Platform: Build Your Own AI Agents, https://www.automationanywhere.com/products/ai-agent-studio.

Cloud Ace Indonesia, "Google Cloud Expands Grounding Capabilities on Vertex AI", https://id.cloud-ace.com/google-cloud-expands-grounding-capabilities-on-vertex-ai/.

Diego Gosmar et al., "AI Multi-Agent Interoperability—Extension for Managing Multiparty Conversations," available at https://arxiv.org/html/2411.05828v1 (Nov. 5, 2024).

Google Cloud Blog, "Build Generative AI Experiences with Vertex AI Agent Builder", https://cloud.google.com/blog/products/ai-machine-learning/build-generative-ai-experiences-with-vertex-ai-agent-builder.

Kumar, Ajoy, BMC Blogs, "Architectural Approach for Building Generative AI Applications", https://www.bmc.com/blogs/architectural-approach-for-building-generative-ai-applications/.

Leeway Hertz, "How to Build an AI Agent System: Exploring Types, Architecture, Tools for Success and Strategic Benefits", https://www.leewayhertz.com/how-to-build-an-ai-agent/.

Project Pro, "How to Build an AI Agent From Scratch?", https://www.projectpro.io/article/how-to-build-an-ai-agent-from-scratch/1072.

Relevance AI, "Build an AI Agent That Can Escalate to Humans and Update Its Knowledge", Relevance Academy, https://www.youtube.com/watch?v=iF-7weFHi2M.

Subex, "Generative AI and the Future: Why Agents are the Next Big Leap", https://www.subex.com/article/generative-ai-and-the-future-why-agents-are-the-next-big-leap/.

Tungsten Automation, "Automating with AI Agents", https://www.tungstenautomation.com/learn/blog/automating-with-ai-agents#:~:text= AIAgents promise to address, is not configured to handle.

UiPath, "Agentic Automation", On Demand Webinar, https://uipath.com/resources/automation-webinars/the-rise-of-agentic-process-automation.

"AutoFlow: Automated Workflow Generation for Large Language Model Agents", arXiv:2407.12821v1.

Akhtar, et al., "Process Automation Product Survey: Robotic Process Automation (RPA), Intelligent Document Processing (IDP), and Process Discovery/Mining, Emerging Technology Community of Interest", Intelligent Automation Working Group, Released Mar. 15, 2021.

Amaxra, A Comprehensive Guide to Windows Autopilot, https://amaxra.com/articles/windows-autopilot.

Automation Anywhere, "What is Agentic Process Automation?", https://www.automationanywhere.com/rpa/agentic-process-automation.

BA Copilot, "Generate Flowcharts with AI".

Di Xiao, "Non-Final Office Action", issued Apr. 7, 2025, U.S. Appl. No. 19/006,539.

Fan, et al., "Workflow LLM: Enhancing Workflow Orchestration Capability of Large Language Models", arXiv:2411.0545v1, Nov. 8, 2024.

Kopke, et al., "Introducing the BPMN-Chatbot for Efficient LLM-Based Process Modeling", GEUR-WS.org, vol. 3758/paper-15.pdf.

Kurtis Gills, "Non-Final Office Action", issued Mar. 19, 2025, U.S. Appl. No. 19/006,562.

LLM4Workflow.

Mantri, Siddhartha, Windows IT Pro Blog, "New Windows Autopilot Capabilities and Expanded Partner Support Simplify Modern Device Deployment", https://techcommunity.microsoft.com/blog/windows-itpro-blog/new-windows-autopilot-capabilities-and-expanded-partner-support-simplify-modern-/260430.

Sabatale, "Automate BPMN Diagrams and Note-Taking in Cloud ALM with LLM: AI Text Generation".

Schoenwald, Robin, "Generate Process Models with GenAI", SAP. SPAR Solutions, One Unified Platform, Infinite Customer Delight, https://www.sparsolutions.com/services/verint/unified-desktop.

Teneo AI, "How Agentic Orchestration is Transforming AI in Business", https://www.teneo.ai/blog/how-agentic-orchestration-is-transforming-ai-in-business.

Txt2BPMN.

Visionet, "Unlocking the Future: How Agentic Process Automation Transforms Business Operations", https://www.visionet.com/blog/unlocking-the-future-how-agentic-process-automation-transforms-business-operations.

Beatriz A Ramirez Bravo, "Non-Final Office Action", issued Jun. 9, 2025, U.S. Appl. No. 19/034,467.

Chen, et al., "Distributed Architecture for an Integrated Development Environment, Large Trace Analysis and Visualization", Aug. 18, 2021.

Daclin, et al., "Generative AI for Business Model Generation (GAI4BM): from Textual Description to Business Process Model", Oct. 16, 2024.

Di Xiao, "Notice of Allowance", issued May 9, 2025, U.S. Appl. No. 19/006,539.

Florian, Razvan V., "Autonomous Artificial Intelligence Agents", Feb. 4, 2003.

Foster, et al., "AutoPilot: Experiences Implementing a Distributed Data-Driven Agent Architecture", 1998.

(56) References Cited

OTHER PUBLICATIONS

Kurtis Gills, "Notice of Allowance", issued May 19, 2025, U.S. Appl. No. 19/006,562.
Mahajan, et al., "Enhancing Workload Predictions Using Service Interactions in Cloud-Native Microservices", IEEE 2024.
Shrimal, et al., "MARCO: Multi-Agent Real-Time Chat Orchestration", Oct. 29, 2024.
Yao, et al., "Tree of Thoughts: Deliberate Problem Solving with Large Language Models, 37th Conference on Neural Information Processing Systems", arXiv:2305.10601v2 [cs. CL] Dec. 3, 2023.
Ye, et al., "ProAgent: From Robotic Process Automation to Agentic Process Automation", Nov. 23, 2023.

\* cited by examiner

UNIFIED AGENTIC AUTOMATION AND ROBOTIC PROCESS AUTOMATION WITH SELF-HEALING AND CAPABILITIES TO INCREASE AUTONOMY

CROSS REFERENCE TO RELATED APPLICATION

This application claims the benefit of U.S. Provisional Patent Application No. 63/710,542 filed Oct. 22, 2024. The subject matter of this earlier filed application is hereby incorporated by reference in its entirety.

FIELD

The present invention generally relates to software automation, and more specifically, to unified solutions for agentic automation and robotic process automation (RPA) with self-healing and capabilities to increase autonomy.

BACKGROUND

Artificial intelligence (AI) agents have been employed that have memory, a knowledge base (e.g., a repository of policies), generative AI and large language model (LLM) capabilities that enable natural language communications, and decision making capabilities based on historical information. For instance, a user may send a natural language query to the AI agent via a prompt and the AI agent may provide a response based on its knowledge base and LLM. These AI agents may also have human-in-the-loop capabilities where they can reach out to a human user for queries that they cannot effectively address. However, these AI agents tend to be their own independent software applications that are developed independently and do not have effective interoperability with other applications and software functionality. Accordingly, an improved and/or alternative approach may be beneficial.

SUMMARY

Certain embodiments of the present invention may provide solutions to the problems and needs in the art that have not yet been fully identified, appreciated, or solved by current software automation technologies and/or provide a useful alternative thereto. For example, some embodiments of the present invention pertain to unified solutions for agentic automation and RPA with self-healing and capabilities to increase autonomy.

In an embodiment, one or more non-transitory computer-readable media store one or more computer programs. The one or more computer programs are configured to cause at least one processor to execute a first AI agent or a first RPA robot to perform an automation and determine, by the first AI agent, that a second AI agent, the first RPA robot, or a second RPA robot should be used for the automation while executing the first AI agent, or determine, by the first RPA robot, that the first AI agent or a second AI agent should be used for the automation while executing the first RPA robot. The one or more computer programs are also configured to cause the at least one processor to cause the second AI agent, the first RPA robot, or the second RPA robot to execute its portion of the automation, by the by the first AI agent, or cause the first AI agent or the second AI agent to execute its portion of the automation, by the first RPA robot. The one or more computer programs are further configured to cause the at least one processor to receive execution results from the second AI agent, the first RPA robot, or the second RPA robot, by the by the first AI agent, or receive execution results from the first AI agent or the second AI agent, by the first RPA robot and continue execution of the automation using the execution results, by the first AI agent or the first RPA robot. The first AI agent and the second AI agent are configured to call one or more generative AI models.

In another embodiment, a computer-implemented method includes receiving a request to execute an agentic automation process (AOP), by a conductor application, and starting a job for an AOP engine to execute the AOP, by the conductor application. The computer-implemented method also includes receiving a request from the AOP engine to execute an automation for a step of the AOP via an AI agent or an RPA robot, by the conductor application, and starting a job for the requested AI agent or RPA robot, by the conductor application. The computer-implemented method further includes receiving an indication from the AI agent or RPA robot that the execution of the automation was successful or failed, by the conductor application, and informing the AOP engine that the execution of the automation was successful or failed, by the conductor application.

In yet another embodiment, one or more computing systems include memory storing computer program instructions and at least one processor configured to execute the stored computer program instructions. The computer program instructions are configured to cause the at least one processor to start a job for an AOP engine to execute an AOP. The computer program instructions are also configured to cause the at least one processor to receive a request from the AOP engine to execute an automation for a step of the AOP via an AI agent or an RPA robot and start a job for the requested AI agent or RPA robot. The computer program instructions are further configured to cause the at least one processor to receive an indication from the AI agent or RPA robot that the execution of the automation was successful or failed and inform the AOP engine that the execution of the automation was successful or failed.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Some embodiments pertain to unified solutions for agentic automation and RPA with self-healing and capabilities to increase autonomy. The system of some embodiments includes one or more AI agents, one or more RPA robots, one or more agentic orchestration processes (AOPs), an AOP engine, and a conductor application configured to manage execution of these various components. Generally speaking, the process of some embodiments works as follows. A user or an initiating software process requests that a given AOP be run. The AOP defines a business process, and may utilize one or more RPA robots and/or one or more AI agents to assist with accomplishing this process, such as resolving invoice discrepancies, onboarding an employee, performing compliance checks, synchronizing order data among multiple backend systems, etc.

The conductor application receives a request from the user or the initiating software process and starts an AOP job pertaining to the business process. For instance, the conductor application may send a start job request to an AOP engine (e.g., Temporal®, Camunda®, etc.) with an ID for the AOP. The AOP engine then begins executing the business process associated with the AOP.

If the AOP engine reaches a step in the AOP where an AI agent or RPA robot is used, the AOP engine suspends execution of the AOP and requests that the conductor application start a job for the respective AI agent or RPA robot. The AOP engine may provide the ID of the AI agent or robot and any information pertinent to the execution of the step that the AI agent or RPA robot requires as input. For instance, the AOP engine may provide an email address, a natural language description of a desired action, a screenshot, etc. The conductor application then sends the start job information to the AI agent or RPA robot. If needed, the conductor application may create a new instance of the AI agent or RPA robot if an available instance thereof is not already running.

The AI agent or RPA robot then executes the task for the given AOP step. In some embodiments, this may require more than one AI agent, more than one RPA robot, one or more AI agent and one or more RPA robot, etc. In such cases, the AI agent or RPA robot sends a request to the conductor application to execute another AI agent or RPA robot. The process continues until the step is completed or fails, and a notification is sent by the AI agent or RPA robot to the conductor application, along with any pertinent information needed by the AOP engine (e.g., whether the step was successful or failed, information required by the AOP for the next step, etc.). The conductor application then notifies the AOP engine, which resumes execution of the AOP if the step was successful. If the step was not successful, the AOP may reach out to a human for assistance.

Figure 1:
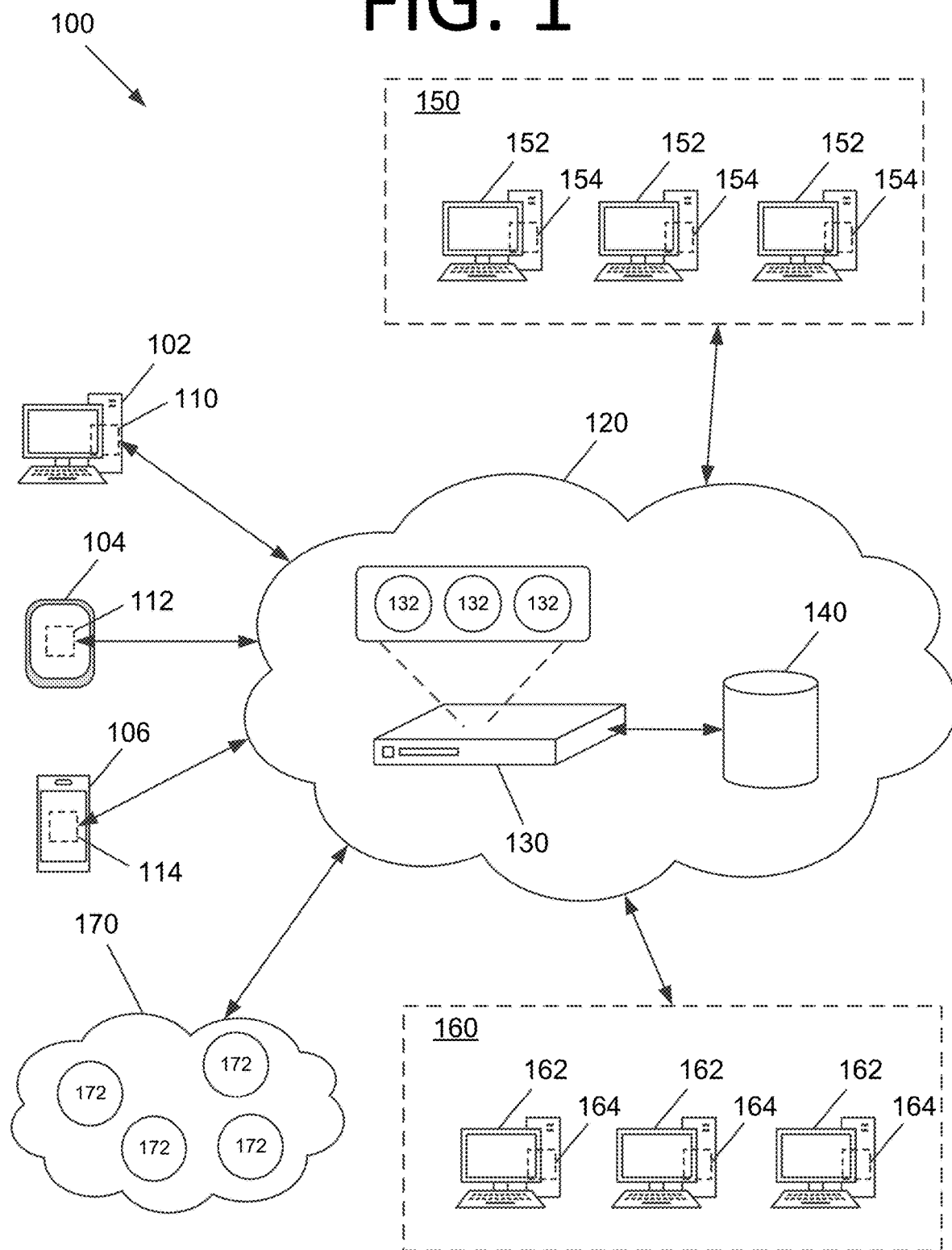
FIG. 1 is an architectural diagram illustrating a hyper-automation system configured to perform agentic automation and orchestration, according to an embodiment of the present invention.

FIG. 1 illustrates some of the combined capabilities 100 of an AI agent 110 and an RPA robot 120, according to an embodiment of the present invention. AI agent 110 is configured to process natural language instructions and achieve expected goals therefrom, execute with dynamic decision making or dynamic flow control with self-healing capabilities, store information in long term memory and evaluate its own execution performance, and learn from humans-in-the-loop and its own performance during execution. RPA robot 120 can be leveraged by AI agent 110 to respond to triggers (e.g., from a conductor application such as UiPath Orchestrator™), to respond based on context (i.e., RPA robot 120 can retrieve information from the context to execute deterministic steps, such as updating a document based on the retrieved information from the context; alternatively, agent 110 can use the retrieved context to update a dynamic plan and execute the next steps complete the goals as per the instructions), to leverage AI models (e.g., computer vision (CV) models, document processing models, speech-to-text models, optical character recognition (OCR) models, etc.), leverage RPA tools (e.g., utilize tools available in the RPA ecosystem, such as complete automations, workflows within automations, integration service connector calls for $3^{rd}$ party and $1^{st}$ party services, RPA designer application activities, LLM calls, etc.), and perform actions that an RPA robot can take (i.e., use the RPA robot as a tool) based on input from the AI agent. AI agent 110 can also take actions to update its memory, update the plan to accomplish its goals per instructions, learn from the actions, self-heal when it encounters roadblocks, and escalate to humans when it needs help.

Figure 2:
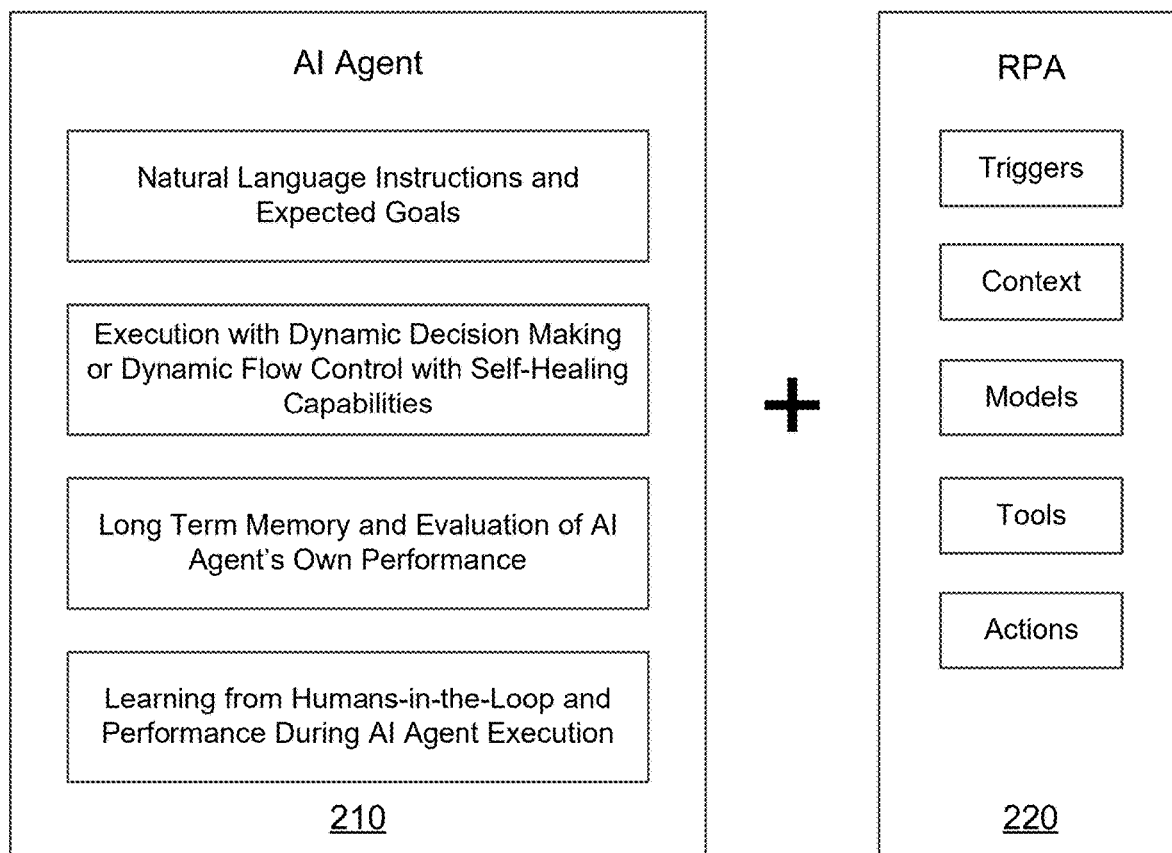
FIG. 2 illustrates some of the combined capabilities of an artificial intelligence (AI) agent and a robotic process automation (RPA) robot, according to an embodiment of the present invention.

Various applications may benefit from unified AI agents and RPA, including, but not limited to, invoice dispute resolution, invoice processing, bank loan application processing, resolving technical specification discrepancies, resolving discrepancies between a product that was ordered and a product that was received, etc. For instance, in the case of invoice dispute resolution, RPA robots and AI agents may work together to address the problem. FIG. 2 illustrates an example invoice dispute resolution scenario 200, according to an embodiment of the present invention. In this scenario, a buyer places a purchase order with a supplier, who then fulfills the order and submits an invoice to the buyer. A first RPA robot performs two-way matching, however, and finds a mismatch between the purchase order and the invoice. The first RPA robot then triggers a first AI agent (a dispute investigation agent) that has to investigate whether the buyer needs to dispute the invoice. The first AI agent determines that this is the case and triggers a second AI agent that has been trained to communicate with suppliers and uses information provided by the first AI agent to communicate via email with a service manager of the supplier and attempt to resolve the dispute. If the second AI agent is able to resolve the dispute, it triggers a second RPA robot that adjusts the finance systems of the buyer accordingly. If not, the second RPA robot escalates the dispute to a human.

In some embodiments, rather than being trained before being introduced into the production environment, the AI agent(s) are initially 100% reliant on human-in-the-loop. As the AI agent processes human responses, it learns to improve and become more autonomous over time. As such, as the AI agent learns to address more and more scenarios, the AI agent will seek to autonomously and dynamically select and implement solutions using the multiple tools at its disposal. As such, agentic automation is the combination of AI, automation, and orchestration. Agentic automation gives AI agents the power to plan, work, and make decisions with minimal human oversight once sufficiently trained.

FIG. 1 is an architectural diagram illustrating a hyper-automation system 100 configured to perform agentic automation and orchestration, according to an embodiment of the present invention. "Hyper-automation," as used herein, refers to automation systems that bring together components of process automation, agentic automation, integration tools, and technologies that amplify the ability to automate work. Some examples of these components include, but are not limited to, AI agents, AOPs, and RPA robots.

Generally, as used herein, "AI agents" are AI-enhanced, probabilistic automations that act independently, act dynamically, make decisions, execute actions, and act adaptively. This may be due to the use of large language models (LLMs) by the AI agents. AI models are typically probabilistic in nature themselves. "AOPs" are automations that allow users to describe overall business processes. AOPs may be created using an interface that allows the creation of business flowcharts that are described in Business Process Model and Notation (BPMN), which is an Extensible Markup Language (XML) description of the business process. See FIG. 5, for example. "RPA robots" are rules-based, deterministic automations that act predictably and make deterministic decisions.

For instance, RPA may be used at the core of a hyper-automation system in some embodiments, and in certain embodiments, automation capabilities may be expanded with AI/machine learning (ML), process mining, analytics, agentic automation, and/or other advanced tools. As the hyper-automation system learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

In such embodiments, AI agents "coexist" in tandem with RPA robots that execute RPAs and AOPs. As noted herein, AI agents are automations, enhanced with AI skills, that can act independently and dynamically make decisions, execute actions, and adapt their performance. The AI agents can dynamically leverage the tools available via these RPA robots to perform document processing (see, for example, U.S. Patent Application Publication No. 2021/0097274), user interface (UI) automation (see, for example, U.S. Pat. Nos. 10,654,166, 10,990,876, 11,080,548, 11,507,259, 11,733,668, and 11,748,069), semantic copy-and-paste between a source and a target (see, for example, U.S. Pat. No. 12,124,806 and U.S. Patent Application Publication Nos. 2023/0107316, 2023/0415338, and 2024/0220581), etc. AI agents can dynamically select these tools and execute them in the form of a pipeline.

Generally speaking, agentic automation is a probabilistic automation performed by one or more AI agents. Agentic automation expands the automation potential of organizations by placing focus not just on individual tasks, but on entire end-to-end processes. Teams of RPA robots, directed by AI agents, may enable a single employee to achieve the work of many. Agentic automation, via AI agents, gives managers the space to mentor, doctors more time to care for patients, developers the ability to fine-tune their work, engineers the freedom to innovate, and customers seamless and personalized experiences.

Various technical effects, benefits, and advantages may be achieved via agentic automation in some embodiments. Agentic automation improves memory usage by requiring less storage for data and increases processor efficiency by reducing the number of calls and actions. Agentic automation also potentially provides the ability to process gigabytes, terabytes, petabytes, or more, of data that would not be possible by human-implemented processes, whether mental or by hand. Agentic automation also potentially enables fewer triggers and models to be used via dynamic decision making. Whereas RPA alone may require 100 actions in an example scenario, using agentic automation, this may be reduced substantially (e.g., to 15 actions). Context grounding may also be employed to tether the AI agent to the desired context for the agentic automation. Accordingly, context grounding "constrains" an LLM to a pertinent context.

AI agents may have agentic memory that evolves and remembers user interactions, feedback, corrections, and solutions (e.g., dynamic user inputs from human-in-the-loop operations). As used herein, "human-in-the-loop" or human-in-the-loop operations can include AI agents and RPA robots working cooperatively with users to receive dynamic direct user inputs. As the agentic memory grows, the AI agent can become increasingly autonomous, reducing the need for dynamic direct human inputs and improving efficiency. AI agents may also learn to be more efficient based on the agentic memory if more efficient solutions are contained therein or derived therefrom. For instance, AI agents may periodically process the agentic memory to analyze patterns to achieve greater autonomy.

As used herein, "agentic memory" is a dynamic caching (i.e., storing) system for managing escalations and tool calls. By way of example operation, when the AI agent encounters a problem while running, the AI agent can prompt or otherwise request from a user interaction(s) or feedback about overcoming the problem, store/cache the interaction(s) or feedback, and learn from this interaction or feedback to reduce the need for repeated human input. According to one or more technical effects, benefits, and advantages, agentic memory provides enhanced efficiency by storing solutions to common problems and minimizing potentially costly tool calls. The cooperative operations of the AI agents and the agentic memory potentially "bend the curve" so human interaction is required less and less as the AI agent continually learns via the agentic memory.

Generally speaking, agentic orchestration is implemented by a conductor application to implement one or more AOPs that make use of AI agents and RPA robots. Agentic orchestration in some embodiments orchestrates AI agents (e.g., UiPath Agents™), third-party agents, RPA robots (e.g., UiPath Robots™), AOPs, and humans executing an agentic workflow (e.g., if human approval is required). Agentic orchestration thus enables the automation, modeling, and monitoring of complex business processes from start to finish. Agentic orchestration also provides the unique ability to orchestrate RPA robots, AI agents, third party agents, and people across end-to-end agentic workflows. Agentic orchestration is beneficial for the successful scaling of agentic automation.

AI agents for agentic automation are AI model-based, per the above, enabling the AI agents to work independently of people and implement these agentic automations. AI agents are also goal-oriented, using context to make probabilistic decisions. Further, AI agents are well-suited for ad hoc tasks that require high adaptability. AI agents learn how work is done and improve over time. AI agents can use and choose various tools for accomplishing tasks, gathering context, and taking actions (often through RPA robots used by the AI agents as tools). In some embodiments, AI agents can build workflows and generate automations for RPA robots and/or other AI agents to execute, such as by leveraging UiPath Autopilot™ for developers or another application that helps developers expedite the creation and testing of automations. For instance, AI agents may utilize the designer application via an API to generate another AI agent or an RPA workflow, followed by a human-in-the-loop operation to address any issues with the generated workflow. If correct, the workflow may then be deployed. AI agents may also have varying degrees of autonomy, which is governed by the agentic orchestration.

The AI agent, by executing an "agentic loop," generates a dynamic plan to achieve goals per instructions using the provided tools and context. Once the dynamic plan is generated, the AI agent utilizes an efficient execution path for the dynamic plan. If the dynamic plan has two or more steps that can be executed in parallel, the AI agent executes these steps in parallel based on the available resources. After each step is completed, the AI agent retrieves the output from the step and regenerates the next step or steps. Thus, the agentic loop continues until the goals are achieved. Executing the steps of the dynamic plan in parallel and using the ecosystem tools and context grounding are advanced capabilities for the agentic orchestration.

As noted herein, RPA robots are rules-based, act predictably, and make deterministic decisions. RPA robots are highly reliable, efficient, and well-suited for routine tasks. RPA robots, along with AI agents, may use human-in-the-loop operations for exception management. According to some embodiments, AI agents are more flexible, more abstract, and more self-determining than RPA robots and AOPs. RPA robots are typically more stable, more concrete, and more governable than AI agents and AOPs. AOPs processes typically fall in between the respective flexibility/stability, abstract/concrete, and self-determining/governable qualities of AI agents and RPA robots.

Figure 3:
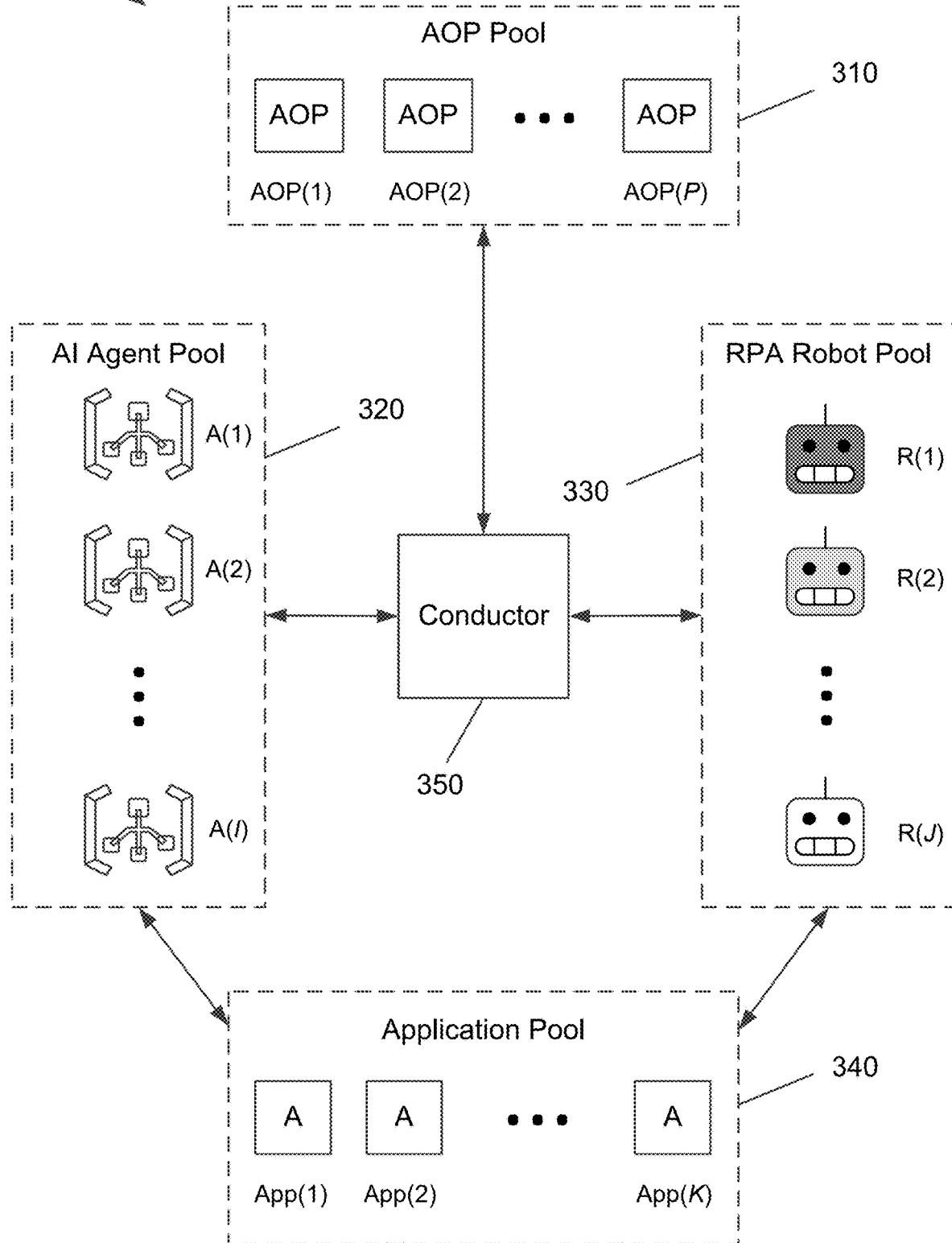
FIG. 3 illustrates pools of AI agents, RPA robots, agentic orchestration processes (AOPs), and applications, according to an embodiment of the present invention.

As described further herein with respect to FIG. 3, AI agents and RPA robots can potentially find and use one another as tools to accomplish a task. AI agents and RPA robots may also be able to access and use various applications (e.g., via application programming interfaces (APIs)). Tools may be manually configured for an automation by a developer and/or the AI agents and RPA robots may discover and use tools at runtime.

According to some embodiments, AI agents, AOPs, and RPA robots may work cooperatively with users (e.g., human-in-the-loop), enabling AI agents, AOPs, and RPA robots to make faster, more consistent, and more informed decisions. Furthermore, the use of AI agents, AOPs, and RPA robots enables people to accomplish more, as AI agents, AOPs, and RPA robots may take on additional repetitive, mundane, and ad hoc tasks at a scale that is not possible for human users to operate. People may make the necessary decisions when AI agents, AOPs, or RPA robots encounter an exception. People may thus be elevated to, and focused on, being supervisors, decision makers, and organizational leaders.

AI models provide AI agents with the ability to reason, plan, create, and make autonomous decisions. AI models can also be used by RPA robots for task-specific activities, such as processing a document or analyzing data. AI models may be enhanced with business-specific content and context (e.g., from a collection of context repositories for an enterprise), improving the accuracy and results of the AI models. AI models can be applied individually or concurrently, depending on the complexity of the task. AI model selection can come from the RPA vendor's model library, third-party models, and bring-your-own-model (BYOM) options (see, for example, U.S. Pat. Nos. 11,738,453; 11,748,479).

Hyper-automation system 100 includes user computing systems, such as desktop computer 102, tablet 104, and smart phone 106. However, any desired user computing system may be used without deviating from the scope of the invention including, but not limited to, smart watches, laptop computers, servers, Internet-of-Things (IoT) devices, etc. Also, while three user computing systems are shown in FIG. 1, any suitable number of user computing systems may be used without deviating from the scope of the invention. For instance, in some embodiments, dozens, hundreds, thousands, or millions of user computing systems may be used. The user computing systems may be actively used by a user or run automatically without much or any user input.

As disclosed herein, there are three types of automations in some embodiments: (1) agentic automations that are implemented by respective AI agents; (2) RPAs that are implemented by respective RPA robots; and (3) composite automations that are achieved by a combination of AI agent(s) and RPA robot(s) to accomplish a more complex overall task. Automations 110, 112, 114 may include, but are not limited to, those executed by RPA robots and/or AI agents, whether individually or to achieve a larger composite automation. Other processes may also be implemented, such as listeners. These processes may be standalone applications, subprocesses of another application, part of an operating system, any other suitable software and/or hardware, or any combination of these without deviating from the scope of the invention. Indeed, in some embodiments, the logic of the process(es) is implemented partially or completely via physical hardware.

Each user computing system 102, 104, 106 has respective automations 110, 112, 114 running thereon, such as those implemented by RPA robots, AI agents, etc. In some embodiments, automations 110, 112, 114 can be stored remotely (e.g., on server 130 or in database 140 and accessed via network 120) and loaded by RPA robots and/or AI agents to implement automations 110, 112, 114. Database 140 may store structured and/or unstructured data, although the former is typically required for RPAs. RPA automations may exist as a script (e.g., Extensible Markup Language (XML), Extensible Application Markup Language (XAML), etc.) or be compiled into machine readable code (e.g., as a digital link library). In the case of AI agents, agentic automations may be generated based on plain text descriptions of a desired goal, for example.

Listeners monitor and record data pertaining to user interactions with respective computing systems and/or operations of unattended computing systems and send the data to a core hyper-automation system 120 via a network (e.g., a local area network (LAN), a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from the listeners may be sent periodically as part of a heartbeat message. In some embodiments, the data may be sent to core hyper-automation system 120 once a predetermined amount of data has been collected, after a predetermined time period has elapsed, or both. One or more servers, such as server 130, receive and store data from the listeners in a database, such as database 140.

In the case of automations 110, 112, 114 being RPAs, automations 110, 112, 114 may execute the logic developed in workflows during design time. The workflows may include a set of steps, defined herein as "activities," that are executed in a sequence or some other logical flow. Each activity may include an action, such as clicking a button, reading a file, writing to a log panel, etc. In some embodiments, workflows may be nested or embedded.

Long-running workflows for RPA in some embodiments are master projects that support service orchestration, human-in-the-loop, and long-running transactions in unattended environments. See, for example, U.S. Pat. No. 10,860,905, which is hereby incorporated by reference in its entirety. Human-in-the-loop comes into play when certain processes require human inputs (e.g., dynamic direct user inputs) to handle exceptions, approvals, or validation before proceeding to the next step in the activity. In this situation, the process execution is suspended, freeing up the RPA robots until the human-in-the-loop portion of the task is completed.

A long-running workflow may support workflow fragmentation via persistence activities and may be combined with invoke process and non-user interaction activities, orchestrating human-in-the-loop tasks with RPA robot tasks. In some embodiments, multiple or many computing systems may participate in executing the logic of a long-running workflow. The long-running workflow may run in a session to facilitate speedy execution. In some embodiments, long-running workflows may orchestrate background processes that may contain activities performing API calls and running in the long-running workflow session. These activities may be invoked by an invoke process activity in some embodiments. A process with user interaction activities that runs in a user session may be called by starting a job from a conductor activity (conductor described in more detail later herein). The user may interact through tasks that require forms to be completed in the conductor in some embodiments. Activities may be included that cause the RPA robot to wait for a form task to be completed and then resume the long-running workflow.

One or more of automations 110, 112, 114 is in communication with core hyper-automation system 120. In some embodiments, core hyper-automation system 120 may run a conductor application on one or more servers, such as server 130. While one server 130 is shown for illustration purposes, multiple or many servers that are proximate to one another or in a distributed architecture may be employed without deviating from the scope of the invention. For instance, one or more servers may be provided for conductor functionality, AI/ML model serving, authentication, governance, and/or any other suitable functionality without deviating from the scope of the invention. In some embodiments, core hyper-automation system 120 may incorporate or be part of a public cloud architecture, a private cloud architecture, a hybrid cloud architecture, etc. In certain embodiments, core hyper-automation system 120 may host multiple software-based servers on one or more computing systems, such as server 130. In some embodiments, one or more servers of core hyper-automation system 120, such as server 130, may be implemented via one or more virtual machines (VMs).

In some embodiments, one or more of automations 110, 112, 114 may call one or more AI/ML models 132 deployed on or accessible by core hyper-automation system 120 and trained to accomplish various tasks. For instance, AI/ML models 132 may include models trained to look for various application versions, perform computer vision (CV), perform optical character recognition (OCR), generate user interface (UI) descriptors, offer suggestions for next activities or sequences of activities in RPA workflows, perform semantic matching, perform natural language processing (NLP), generate or modify code and/or RPA workflows, etc. AI/ML models may be trained using labeled data that includes, but is not limited to, elements from data sources (e.g., web pages, forms, scanned documents, application interfaces, screens, etc.), previously created RPA workflows, screenshots of various application screens for various versions with their corresponding UI elements, libraries of UI objects, etc. AI/ML models 132 may be trained to achieve a desired confidence threshold while not being overfit to a given set of training data. Generally speaking, UI elements, UI descriptors, applications, and application screens can be considered to be UI objects.

AI/ML models 132 may be trained for any suitable purpose without deviating from the scope of the invention, as will be discussed in more detail later herein. Two or more of AI/ML models 132 may be chained in some embodiments (e.g., in series, in parallel, or a combination thereof) such that they collectively provide collaborative output(s). AI/ML models 132 may perform or assist with CV, OCR, document processing and/or understanding, semantic learning and/or analysis, analytical predictions, process discovery, task mining, testing, automatic RPA workflow generation, sequence extraction, clustering detection, audio-to-text translation, NLP, semantic matching, any combination thereof, etc. However, any desired number and/or type(s) of AI/ML models may be used without deviating from the scope of the invention. Using multiple AI/ML models may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models are deployed locally on at least one of computing systems 102, 104, 106.

In some embodiments, multiple AI/ML models 132 may be used. Each AI/ML model 132 is an algorithm (or model) that runs on the data, and the AI/ML model itself may be a deep learning neural network (DLNN) of trained artificial "neurons" that are trained on training data, for example. In some embodiments, AI/ML models 132 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to perform the desired functionality.

Hyper-automation system 100 may provide four main groups of functionality in some embodiments: (1) discovery; (2) building automations; (3) management; and (4) engagement. Automations (e.g., run on a user computing system, a server, etc.) may be run by RPA robots, AOPs, or AI agents, for example, in some embodiments, and may provide any of the functionality described herein. By way of example, RPA robots can include attended robots, unattended robots, and/or test robots. Attended robots work with users to assist with tasks (e.g., via UiPath Assistant™). Unattended robots work independently of users and may run in the background, potentially without user knowledge. Test robots run test cases against applications or RPA workflows. Test robots may be run on multiple computing systems in parallel in some embodiments.

The discovery functionality may discover and provide automatic recommendations for different opportunities for automation of business processes. Such functionality may be implemented by one or more servers, such as server 130. The discovery functionality may include providing an automation hub, process mining, task mining, and/or task capture in some embodiments. The automation hub (e.g., UiPath Automation Hub™) may provide a mechanism for managing automation rollout with visibility and control. Automation ideas may be crowdsourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from user computing systems 102, 104, 106 by listeners, for example, and processed by servers, such as server 130. One or more AI/ML models 132 may be employed for this purpose in some embodiments. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 132 may be employed to uncover recurring task patterns in the data. Repetitive tasks that are ripe for automation may then be identified. This information may initially be provided by listeners and analyzed on servers of core hyper-automation system 120, such as server 130, in some embodiments. The findings from task mining (e.g., XAML process data) may be exported to process documents or to a designer application such as UiPath Studio™ to create and deploy automations more rapidly. Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to a designer application in some embodiments, such as UiPath Studio™. Task capture may simplify the requirements gathering process for both subject matter experts explaining a process and Center of Excellence (CoE) members providing production-grade automations.

Building automations may be accomplished via a designer application (e.g., UiPath Studio™, UiPath StudioX™, or UiPath Studio Web™). For instance, developers of an RPA development facility 150 may use designer applications 154 of computing systems 152 to build and test agentic automations, RPAs, AOPs, and/or composite automations for various applications and environments, such as web, mobile, SAP®, and virtualized desktops. Developers may also build AOPs. For instance, developers may create automations to be executed by RPA robots, AI agents, AOPs, a combination thereof, etc. API integration may be provided for various applications, technologies, and platforms. Predefined activities, drag-and-drop modeling, and a workflow recorder, may make automation easier with minimal coding. Document understanding functionality may be provided via drag-and-drop AI skills for data extraction and interpretation that call one or more AI/ML models 132. Such automations may process virtually any document type and format, including tables, checkboxes, signatures, and handwriting. When data is validated or exceptions are handled, this information may be used to retrain the respective AI/ML models, improving their accuracy over time.

Designer application 152 may be designed to call one or more of trained AI/ML models 132 on server 130 and/or generative AI models 172 in a cloud environment via network 120 (e.g., a local area network (LAN), a mobile communications network, a satellite communications network, the Internet, any combination thereof, etc.) to assist with the automation development process. In some embodiments, one or more of the AI/ML models may be packaged with designer application 152 or otherwise stored locally on computing system 150.

In some embodiments, designer application 152 and one or more of AI/ML models 132 may be configured to use an object repository stored in database 140. See, for example, U.S. Pat. No. 11,748,069, which is hereby incorporated by reference in its entirety. Generally speaking, the object repository is a storage mechanism used by automations for images, text, semantic data, taxonomical associations, ontological associations, UI objects, etc. For example, the object repository may include libraries of UI objects that can be used to develop RPA workflows via designer application 152. The object repository may be used to add UI descriptors to activities in the workflows of designer application 152 for UI automations. In some embodiments, one or more of AI/ML models 132 may generate new UI descriptors and add them to the object repository in database 140.

Once automations are completed in designer application 152, they may be published on server 130, pushed out to computing systems 102, 104, 106, etc. For example, as new UI descriptors are created and/or existing UI descriptors are modified, a global repository of UI object libraries may be built that is sharable and collaborative for all automations. Regarding object repositories, taxonomies and ontologies may be used. A taxonomy is a hierarchical structure of subcategories. An ontology is a formal representation of a domain of knowledge, including concepts, properties, and relationships therebetween. In an ontology, the relationships between categories are not necessarily hierarchical, and the ontological relationship may span multiple screens of an application.

An integration service may allow developers to seamlessly combine UI automation with API automation, for example. Automations, such as any of the types described herein, may be built that require APIs or traverse both API and non-API applications and systems. A repository (e.g., UiPath Object Repository™) or marketplace (e.g., UiPath Marketplace™) for pre-built automation templates and solutions may be provided to allow developers to automate a wide variety of processes more quickly. Thus, when building automations, hyper-automation system 100 may provide user interfaces, development environments, API integration, pre-built and/or custom-built AI/ML models, development templates, integrated development environments (IDEs), and advanced AI capabilities. Hyper-automation system 100 enables development, deployment, management, configuration, monitoring, debugging, and maintenance of RPA robots and AI agents in some embodiments, which may provide automations for hyper-automation system 100.

In some embodiments, components of hyper-automation system 100, such as designer application(s) and/or an external rules engine, provide support for managing and enforcing governance policies for controlling various functionality provided by hyper-automation system 100. Governance is the ability for organizations to put policies in place to prevent users from developing automations (e.g., RPA robots and/or AI agents) capable of taking actions that may harm the organization, such as violating the E.U. General Data Protection Regulation (GDPR), the U.S. Health Insurance Portability and Accountability Act (HIPAA), third party application terms of service, etc. Since developers may otherwise create automations that violate privacy laws, terms of service, etc. while performing their automations, some embodiments implement access control and governance restrictions at the robot and/or robot design application level. This may provide an added level of security and compliance into to the automation process development pipeline in some embodiments by preventing developers from taking dependencies on unapproved software libraries that may either introduce security risks or work in a way that violates policies, regulations, privacy laws, and/or privacy policies. See, for example, U.S. Pat. No. 11,733,668, which is hereby incorporated by reference in its entirety.

The management functionality may provide management, deployment, and optimization of automations across an organization. The management functionality may include orchestration, test management, AI functionality, and/or insights in some embodiments. Management functionality of hyper-automation system 100 may also act as an integration point with third-party solutions and applications for automation applications and/or RPA robots. The management capabilities of hyper-automation system 100 may include, but are not limited to, facilitating provisioning, deployment, configuration, queuing, monitoring, logging, and interconnectivity of RPA robots and/or AI agents, among other things.

A conductor application, such as UiPath Orchestrator™ (which may be provided as part of the UiPath Automation Cloud™ in some embodiments, or on premises, in VMs, in a private or public cloud, in a Linux™ VM, or as a cloud native single container suite via UiPath Automation Suite™), provides orchestration capabilities to deploy, monitor, optimize, scale, and ensure security of RPA robot and/or AI agent deployments. A test suite (e.g., UiPath Test Suite™) may provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

A data service (e.g., UiPath Data Service™) may be stored in database 140, for example, and bring data into a single, scalable, secure place with a drag-and-drop storage interface. Some embodiments may provide low-code or no-code data modeling and storage to automations while ensuring seamless access, enterprise-grade security, and scalability of the data. AI functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models from the AI center, such as AI/ML models 132. Performance of the AI/ML models may be monitored and be trained and improved using human-validated data, such as that provided by data review center 160. Human reviewers may provide labeled data to core hyper-automation system 120 via a review application 152 on computing systems 154. For instance, human reviewers may validate that predictions by AI/ML models 132 and/or generative AI models 172 are accurate or provide corrections otherwise. Human reviewers may also provide dynamic direct user input (e.g., within the scope of human-in-the-loop operations) to AI agents, and the responses and corrections provided by the human reviewers may be used to train LLM(s) used by AI agents to be more accurate. In other words, this dynamic input may be saved as training data for retraining AI/ML models 132 and/or generative AI models 172 and may be stored in a database such as database 140, for example. The AI center may then schedule and execute training jobs to train the new versions of the AI/ML models using the training data. Both positive and negative examples may be stored and used for retraining of AI/ML models 132 and/or generative AI models 172.

The engagement functionality engages humans and automations as one team for seamless collaboration on desired processes. Low-code applications may be built (e.g., via UiPath Apps™) to connect browser tabs and legacy software, even that lacking APIs in some embodiments. Applications may be created quickly using a web browser through a rich library of drag-and-drop controls, for instance. An application can be connected to a single automation or multiple automations.

An action center (e.g., UiPath Action Center™) provides a straightforward and efficient mechanism to hand off processes from automations to humans, and vice versa. Humans may provide approvals or escalations, make exceptions, etc. The automation may then perform the automatic functionality of a given workflow.

A local assistant may be provided as a launchpad for users to launch automations (e.g., UiPath Autopilot™). Such an assistant may also provide semantic cut-and-paste functionality (e.g., UiPath Clipboard AI™). See, for example, U.S. Pat. No. 12,124,806 and U.S. Patent Application Publication Nos. 2023/0107316, 2023/0415338, and 2024/0220581. This functionality may be provided in a tray provided by an operating system, for example, and may allow users to interact with RPA robots and RPA robot-powered applications on their computing systems. An interface may list automations approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

End-to-end measurement and government of an automation program at any scale may be provided by hyper-automation system 100 in some embodiments. Per the above, analytics may be employed to understand the performance of automations (e.g., via UiPath Insights™). Data modeling and analytics using any combination of available business metrics and operational insights may be used for various automated processes. Custom-designed and pre-built dashboards allow data to be visualized across desired metrics, new analytical insights to be discovered, performance indicators to be tracked, ROI to be discovered for automations, telemetry monitoring to be performed on user computing systems, errors and anomalies to be detected, and automations to be debugged. An automation management console (e.g., UiPath Automation Ops™) may be provided to manage automations throughout the automation lifecycle. An organization may govern how automations are built, what users can do with them, and which automations users can access.

Hyper-automation system 100 provides an iterative platform in some embodiments. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

In some embodiments, per the above, generative AI models are used. For instance, AI agents make use of generative AI models. Generative AI models can generate various types of content, such as text, imagery, audio, and synthetic data. Various types of generative AI models may be used, including, but not limited to, LLMs, generative adversarial networks (GANs), diffusion models, flow-based models, variational autoencoders (VAEs), transformers, etc. In the case of LLMs, for example, NLP models such as word2vec, BERT, GPT-3, ChatGPT, etc. may be used in some embodiments to facilitate semantic understanding and provide more accurate and human-like answers. These models may be part of AI/ML models 132 hosted on server 130. For instance, the generative AI models may be trained on a large corpus of textual information to perform semantic understanding, to understand the nature of what is present on a screen from text, to automatically generate code, and the like. AI agents may use such generative AI models. In certain embodiments, generative AI models 172 provided by an existing cloud ML service provider, such as OpenAIR, Google®, Amazon®, Microsoft®, IBM®, Nvidia®, Meta®, etc., may be employed and trained to provide such functionality. In generative AI embodiments where generative AI model(s) 172 are remotely hosted, server 130 can be configured to integrate with third-party APIs, which allow server 130 to send a request to generative AI model(s) 172 including the requisite input information and receive a response in return (e.g., the semantic matches of fields between application versions, a classification of the type of the application on the screen, responses to natural language queries from users, etc.). Such embodiments may provide a more advanced and sophisticated user experience, as well as provide access to state-of-the-art NLP and other ML capabilities that these companies offer.

One aspect of generative AI models in some embodiments is the use of transfer learning. In transfer learning, a pre-trained generative AI mode, such as an LLM, is fine-tuned on a specific task or domain. This allows the LLM to leverage the knowledge already learned during its initial training and adapt it to a specific application. In the case of LLMs, the pretraining phase involves training an LLM on a large corpus of text, typically consisting of billions of words. During this phase, the LLM learns the relationships between words and phrases, which enables the LLM to generate coherent and human-like responses to text-based inputs. The output of this pretraining phase is an LLM that has a high level of understanding of the underlying patterns in natural language.

In the fine-tuning phase, the pretrained LLM is adapted to a specific task or domain by training the LLM on a smaller dataset that is specific to the task. For instance, in some embodiments, the LLM may be trained to analyze a certain type or multiple types of data sources to improve its accuracy with respect to their content. This data may include, but is not limited to, prompt tuning or instruction tuning, where the model is specifically trained to better understand and follow certain types of instructions or prompts, improving its ability to perform specific tasks when given appropriate instructions. Such information may be provided as part of the training data, and the LLM may learn to focus on these areas and more accurately identify data elements therein. Fine-tuning allows the LLM to learn the nuances of the task or domain, such as the specific vocabulary and syntax used in that domain, without requiring as much data as would be necessary to train an LLM from scratch. By leveraging the knowledge learned in the pretraining phase, the fine-tuned LLM can achieve state-of-the-art performance on specific tasks with a relatively small amount of training data.

LLMs may use a vector database. Vector databases index, store, and provide access to structured or unstructured data (e.g., text, images, time series data, etc.) alongside the vector embeddings thereof. Data such as text may be tokenized, where single letters, words, or sequences of words are parsed from the text into tokens. These tokens are then "embedded" into vector embeddings, which are the numerical representations of this data. Vector databases enable LLMs to find and retrieve similar objects quickly and at scale in production environments, which is not possible via manual processes.

AI and ML allow unstructured data to be numerically represented without losing the semantic meaning thereof in vector embeddings. A vector embedding is a long list of numbers, each describing a feature of the data object that the vector embedding represents. Similar objects are grouped together in the vector space. In other words, the more similar the objects are, the closer that the vector embeddings representing the objects will be to one another. Similar objects may be found using a vector search, similarity search, or semantic search. The distance between the vector embeddings may be calculated using various techniques including, but not limited to, squared Euclidean or L2-squared distance, Manhattan or L1 distance, cosine similarity, dot product, Hamming distance, etc. It may be beneficial to select the same metric that is used to train the AI/ML model.

Vector indexing may be used to organize vector embeddings so data can be retrieved efficiently. Calculating the distance between a vector embedding and all other vector embeddings in the vector database using the k-Nearest Neighbors (kNN) algorithm can be computationally expensive if there are a large number of data points since the required calculations increase linearly (O (n)) with the dimensionality and the number of data points. It is more efficient to find similar objects using an approximate nearest neighbor (ANN) approach. The distances between the vector embeddings are pre-calculated, and similar vectors are organized and stored close to one another (e.g., in clusters or a graph) similar objects can be found faster. This process is called "vector indexing." ANN algorithms that may be used in some embodiments include, but are not limited to, clustering-based indexing, proximity graph-based indexing, tree-based indexing, hash-based indexing, compression-based indexing, etc.

FIG. 2 illustrates some of the combined capabilities 200 of an AI agent 210 and an RPA robot 220, according to an embodiment of the present invention. AI agent 210 is configured to process natural language instructions and achieve expected goals therefrom, execute with dynamic decision making or dynamic flow control with self-healing capabilities, store information in long term memory and evaluate its own execution performance, and learn from humans-in-the-loop and its own performance during execution. RPA robot 220 can be leveraged by AI agent 210 to respond to triggers (e.g., from a conductor application such as UiPath Orchestrator™), to respond based on context (i.e., RPA robot 220 can retrieve information from the context to execute deterministic steps, such as updating a document based on the retrieved information from the context; alternatively, agent 210 can use the retrieved context to update a dynamic plan and execute the next steps complete the goals as per the instructions), to leverage AI models (e.g., CV models, document processing models, speech-to-text models, OCR models, etc.), leverage RPA tools (e.g., utilize tools available in the RPA ecosystem, such as complete automations, workflows within automations, integration service connector calls for $3^{rd}$ party and $1^{st}$ party services, RPA designer application activities, LLM calls, etc.), and perform actions that an RPA robot can take (i.e., use the RPA robot as a tool) based on input from the AI agent. AI agent 210 can also take actions to update its memory, update the plan to accomplish its goals per instructions, self-evaluate and learn from the actions, self-heal when it encounters roadblocks, and escalate to humans when it needs help.

As discussed above, various technical effects, benefits, and advantages may be achieved via agentic automation in some embodiments. Agentic automation improves memory usage by requiring less storage for data and increases processor efficiency by reducing the number of calls and actions. Agentic automation also potentially provides the ability to process gigabytes, terabytes, petabytes, or more, of data that would not be possible by human-implemented processes, whether mental or by hand. It also potentially enables fewer triggers and models to be used via dynamic decision making. Whereas RPA alone may require 100 actions in an example scenario, using agentic automation, this may be reduced substantially (e.g., to 15 actions). Context grounding may also be employed to tether the AI agent to the desired context for the agentic automation. This "constrains" the LLM to a pertinent context.

As used herein, "context grounding" refers to a methodology to improve models, such as LLMs, by integrating enterprise-specific information with pretrained knowledge, enabling accurate responses to specialized or recent queries. In some embodiments, context grounding uses external data to augment the LLM response and get a response that the LLM does not know about innately and answer queries on top of the context provided. By way of example, because unique industry terminology and complex document structures can pose challenges in ensuring effective retrieval and semantic matching, context grounding solves challenges by providing precise chunking of documents to ensure relevant information (e.g., from the unique industry terminology and complex document structures) can be passed to an LLM without noise. By way of an additional example, context grounding provides enhanced extraction and search techniques tailored to diverse industries and applications (e.g., tailored to the unique industry terminology and complex document structures) that improves the LLM response.

FIG. 3 illustrates pools 300 of AOPs, AI agents, RPA robots, and applications, according to an embodiment of the present invention. AOP pool 310 includes AOPs 1, 2, . . . , P that implement business processes. Per the above, the AOPs may be implemented as BPMN, which is executed by an AOP execution engine, such as Temporal®. AOPs can utilize AI agents and/or RPA robots to execute parts of the business process.

AI agent pool 320 includes AI agents 1, 2, . . . , I that have been trained to perform various tasks, such as investigating claims, seeking resolution with human employees, summarizing policies and technical specifications, etc. RPA robot pool 330 includes RPA robots 1, 2, . . . ,J that execute various automations, such as UI automations, semantic matching automations, form filling automations, etc. Application pool 340 includes applications 1, 2, . . . , K that the AI agents and/or RPA robots can interact with. For instance, the applications may include CRM applications, invoicing applications, payroll applications, banking applications, web applications, legacy system applications, word processing applications, spreadsheet applications, email applications, etc. The AI agents, RPA robots, and applications may be on a single computing system or on multiple or many computing systems. AOPs are typically in the cloud or otherwise server side, and may be on the same computing system(s) as conductor application 350 in some embodiments.

The AOPs can trigger or call the AI agents and RPA robots via conductor application 350. The AI agents and RPA robots can also trigger or call one another via conductor application. For instance, to call an RPA robot, the AI agent may make a "Start Job" call in conductor application 350. It should be noted that the RPA robots are deployed as automations that are controlled by conductor application 350. The AI agents and RPA robots can also trigger or call certain applications. For instance, via information gleaned from human-in-the-loop actions, the AI agents may dynamically learn which RPA robots, other AI agents, and/or applications to trigger or call to achieve a task. For instance, an AI agent may learn to trigger an RPA robot via conductor application 350 to fill out and submit a web form. The AI agent may also learn to open Microsoft Excel® and enter the form information into appropriate tabs, open and update a payroll application, etc. The AI agent may further learn to call or trigger an email resolution AI agent via conductor application 350 that reaches out to a human customer service representative of a bank if an issue occurs. The technical effects, benefits, and advantages may be similar to those discussed above with respect to FIGS. 1 and 2 in some embodiments.

In order for AI agents and RPA robots to find one another, the AI agents may belong to a tenant. The designer application may call the conductor to get the list of available RPAs. There are three ways for getting the capabilities of automations in some embodiments: (1) the user provides a description of what the automation does while creating the workflow in the designer application; (2) AI agents and ML techniques are used to generate a summary of what a given workflow does; or (3) the developer can describe what the automation does in the designer application. The conductor application may also have lists of what applications are available to given AI agents and RPA robots. In other words, descriptions of available AI agents, RPA robots, and/or applications are derived from or assigned by AI agents, ML techniques, or users.

Figure 4A:
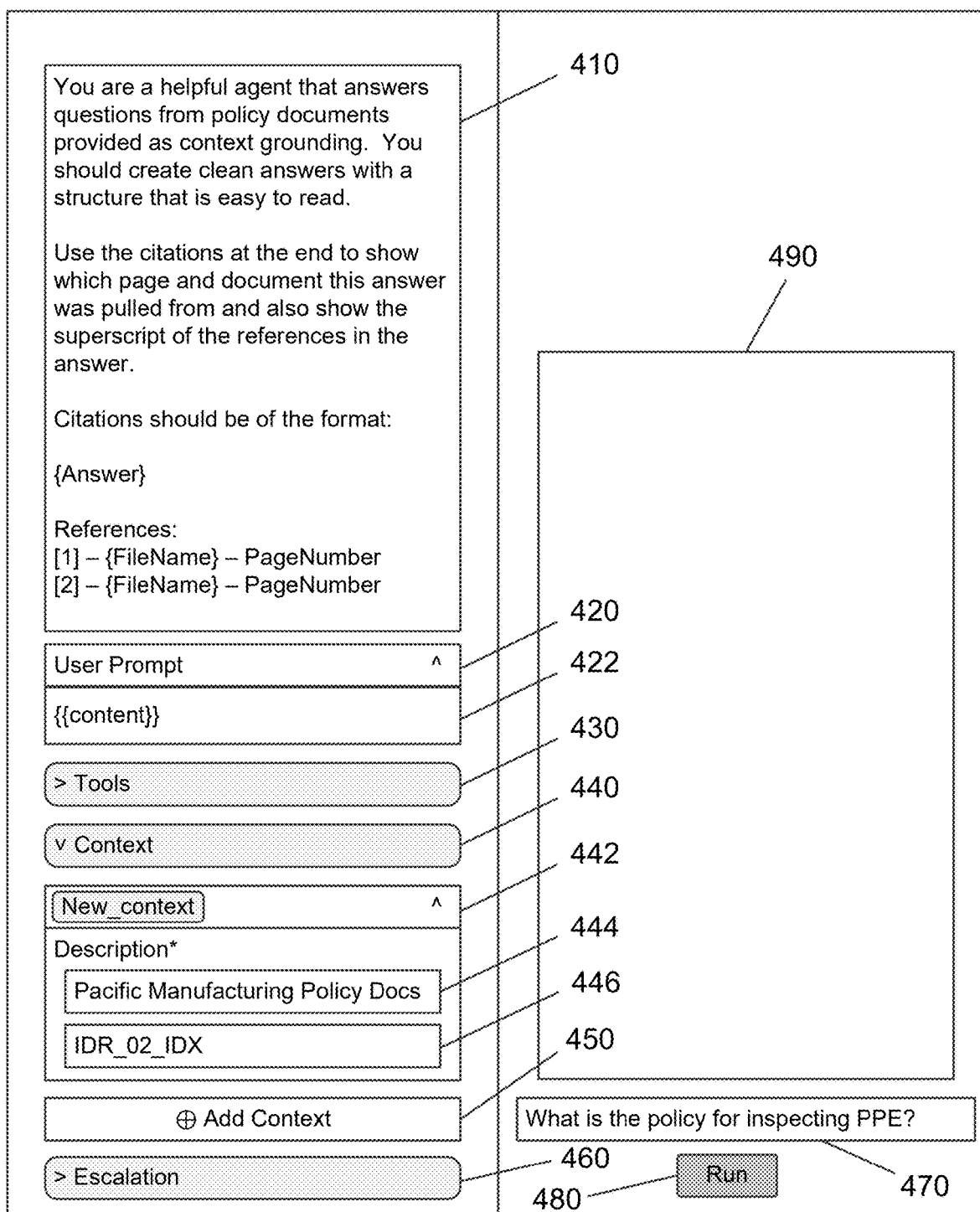
FIGS. 4A and 4B illustrate an example AI agent service interface, according to an embodiment of the present invention.
Figure 4B:
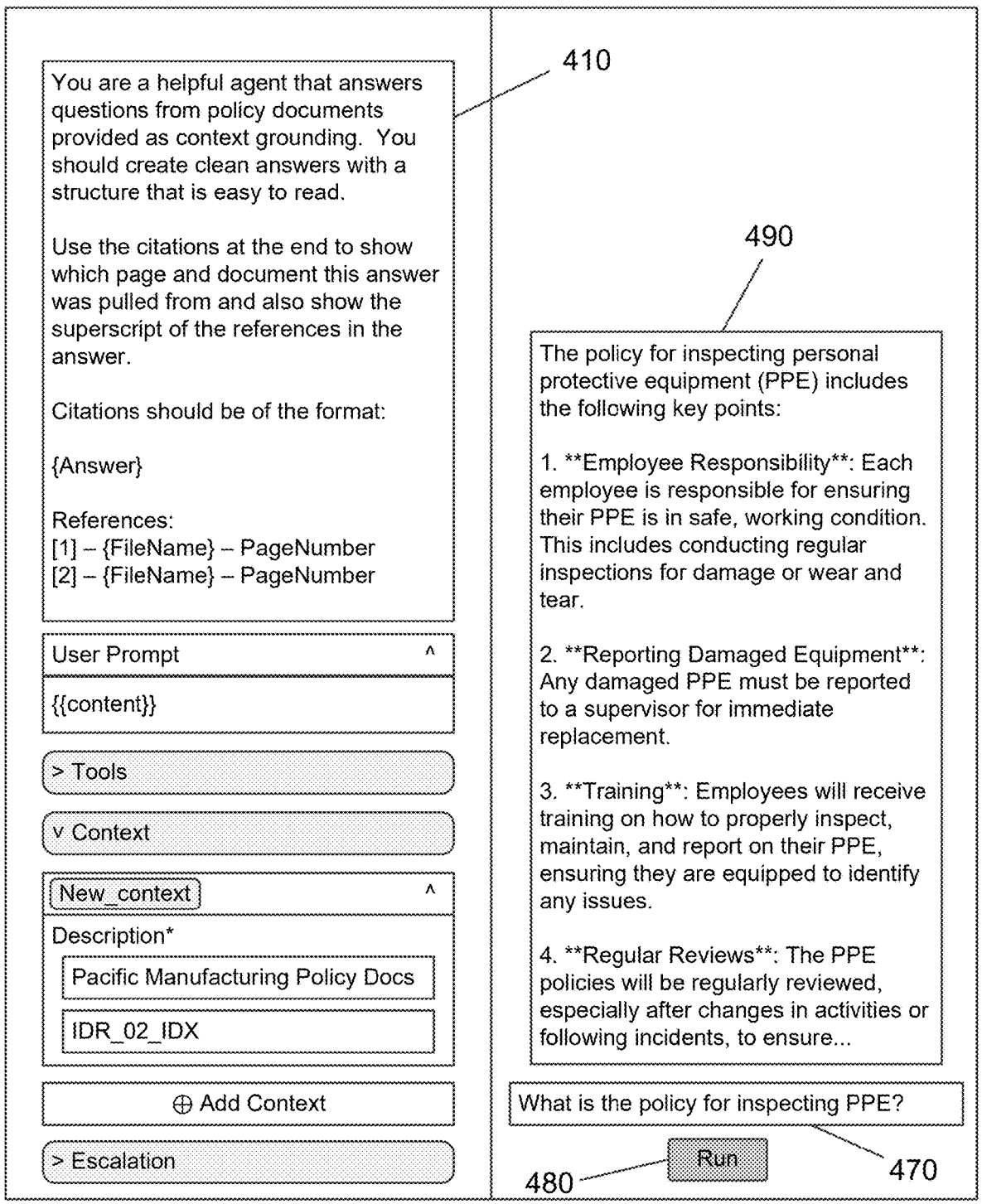

FIGS. 4A and 4B illustrate an example agent service interface 400, according to an embodiment of the present invention. Referring to FIG. 4A, the agent answers questions regarding policy documents that are provided within context grounding. An agent instructions pane 410 includes a natural language description entered by a user of what the AI agent is intended to do. A user prompt 420 allows the developer to enter content for a user prompt in a content field 422, if desired. Tools dropdown 430 allows the developer to select tools that the AI agent will utilize, such as using APIs for applications, calling RPA robots to execute RPAs, etc.

A context dropdown 440 allows the developer to configure the context grounding for the AI agent. A context configuration pane 442 allows the developer to provide a description via description field 444 and an Elastic Common Schema (ECS) index via ECS index field 446 for specific policy documents that have information regarding contracts, stipulation and what to do, etc. in this example. The developer can also add additional context 450 to further supplement the context grounding. Human escalation options can be configured via dropdown 460.

A query field 470 allows the user to provide a query that the AI agent will respond to. The AI agent runs the query when the user clicks run button 480. Turning to FIG. 4B, the results during AI agent execution are then shown in execution pane 490 as the AI agent retrieves and outputs them.

Figure 5:
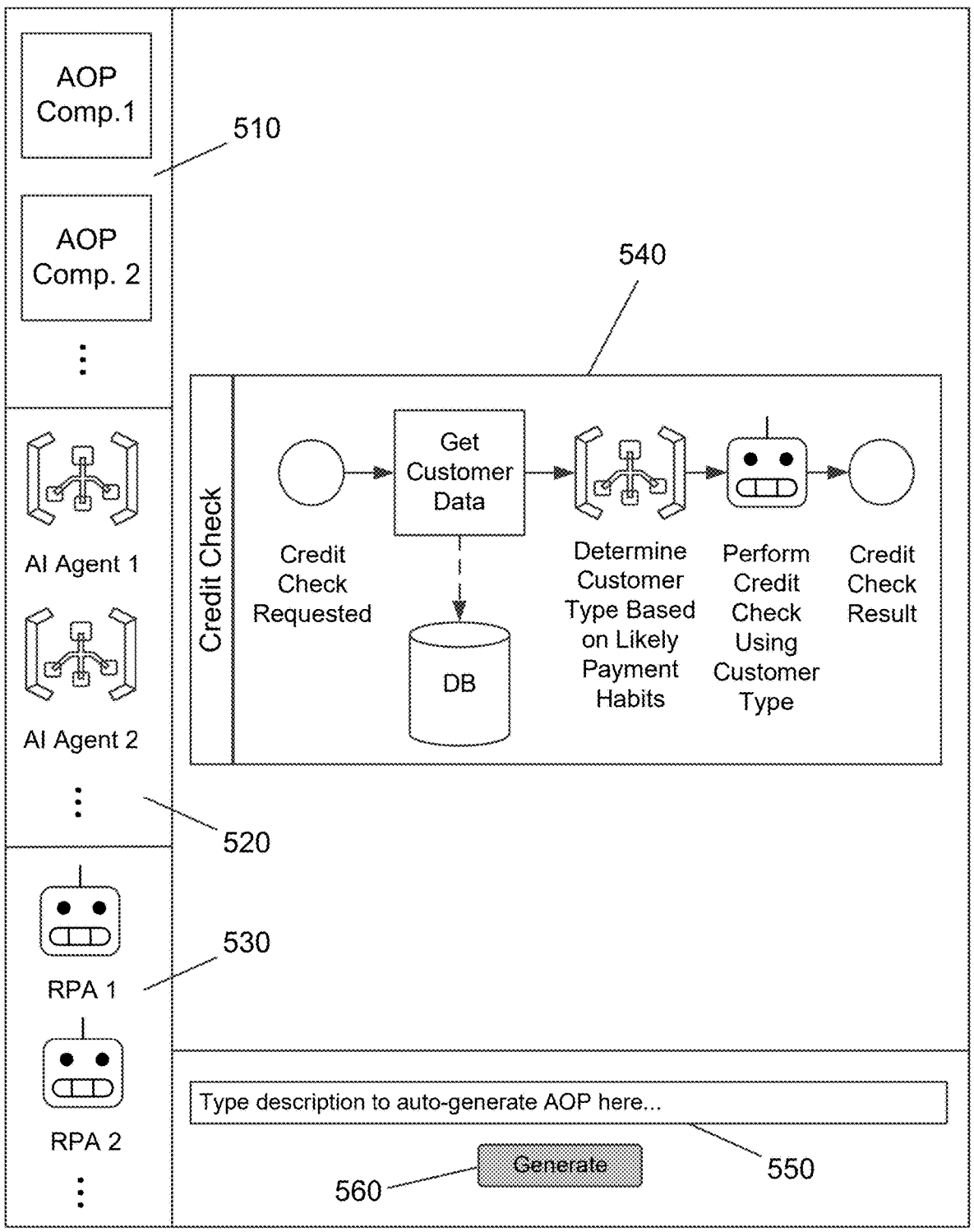
FIG. 5 illustrates an example AOP development interface, according to an embodiment of the present invention.

FIG. 5 illustrates an example AOP development interface 500, according to an embodiment of the present invention. AOP development interface 500 includes AOP components 510, AI agents 520, and RPAs 530 that the user can select when developing a business process. These can be selected and dragged to a canvas 540 where the user can manually develop the AOP. In this example, a credit check is implemented by getting customer data from a database, calling an AI agent to determine a customer type (e.g., highly likely to pay, likely to miss payments, frequently between jobs, etc.) by analyzing the customer data. The type is then provided to an RPA robot that takes this information into account when performing a credit check. Alternatively, the AOP developer can type a description of the business process into field 550 and click a generate button 560. This text is provided to an LLM, which attempts to understand the requested business process and automatically create the AOP workflow. The AOP developer can then edit the AOP workflow as desired.

Figure 6:
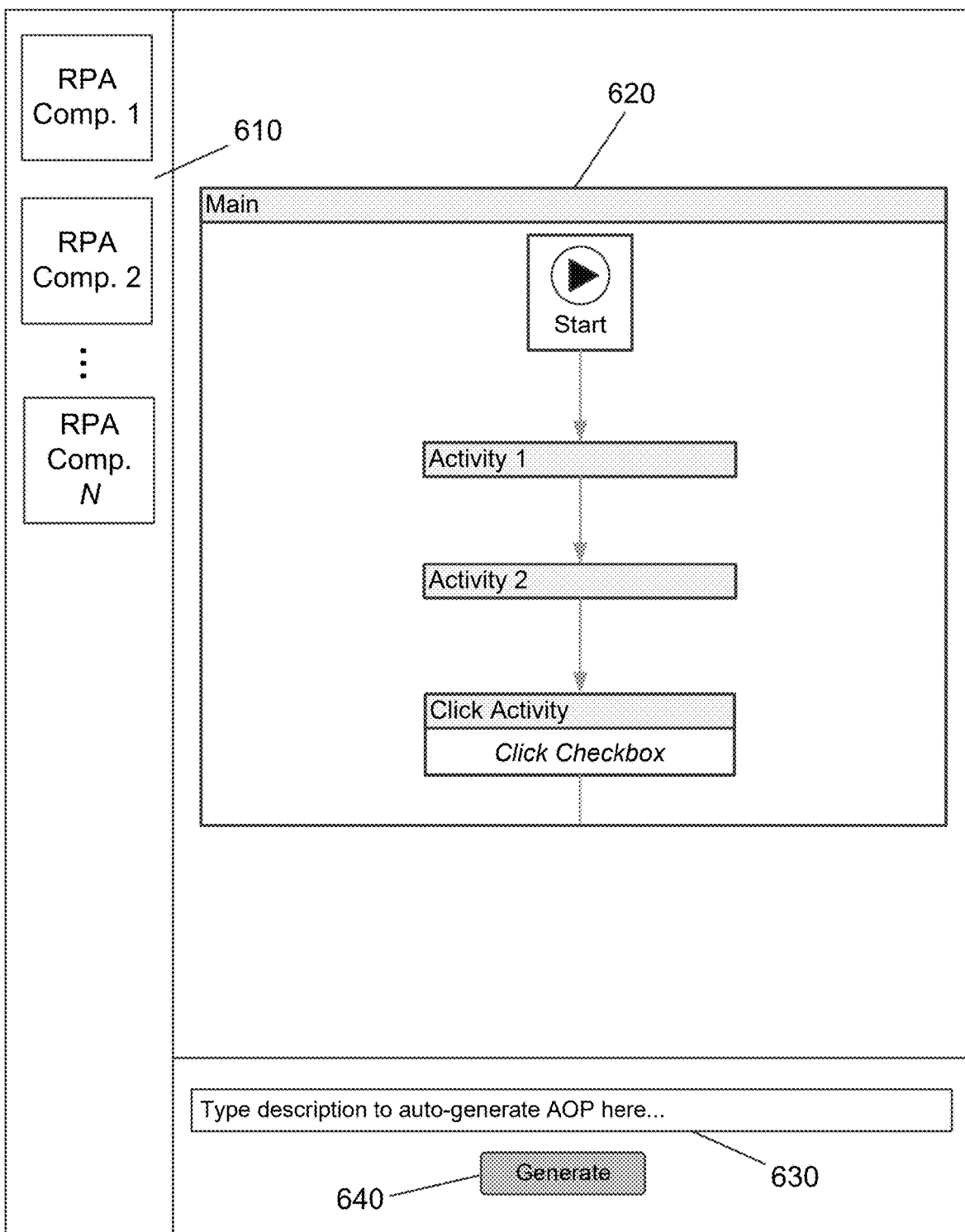
FIG. 6 illustrates an example RPA development interface, according to an embodiment of the present invention.

FIG. 6 illustrates an example RPA development interface 600, according to an embodiment of the present invention. RPA development interface 600 includes RPA components 610 that the user can select when developing an RPA workflow. These can be selected and dragged to a canvas 620. Alternatively, the RPA developer can type a description of the RPA into field 630 and click a generate button 640. This text is provided to an LLM, which attempts to understand the requested business process and automatically create the RPA workflow. The developer can then edit the RPA workflow as desired. It should be noted that the functionality shown and described with respect to FIGS. 4A, 4B, 5 and 6 may be provided in a single designer application in some embodiments.

Figure 7:
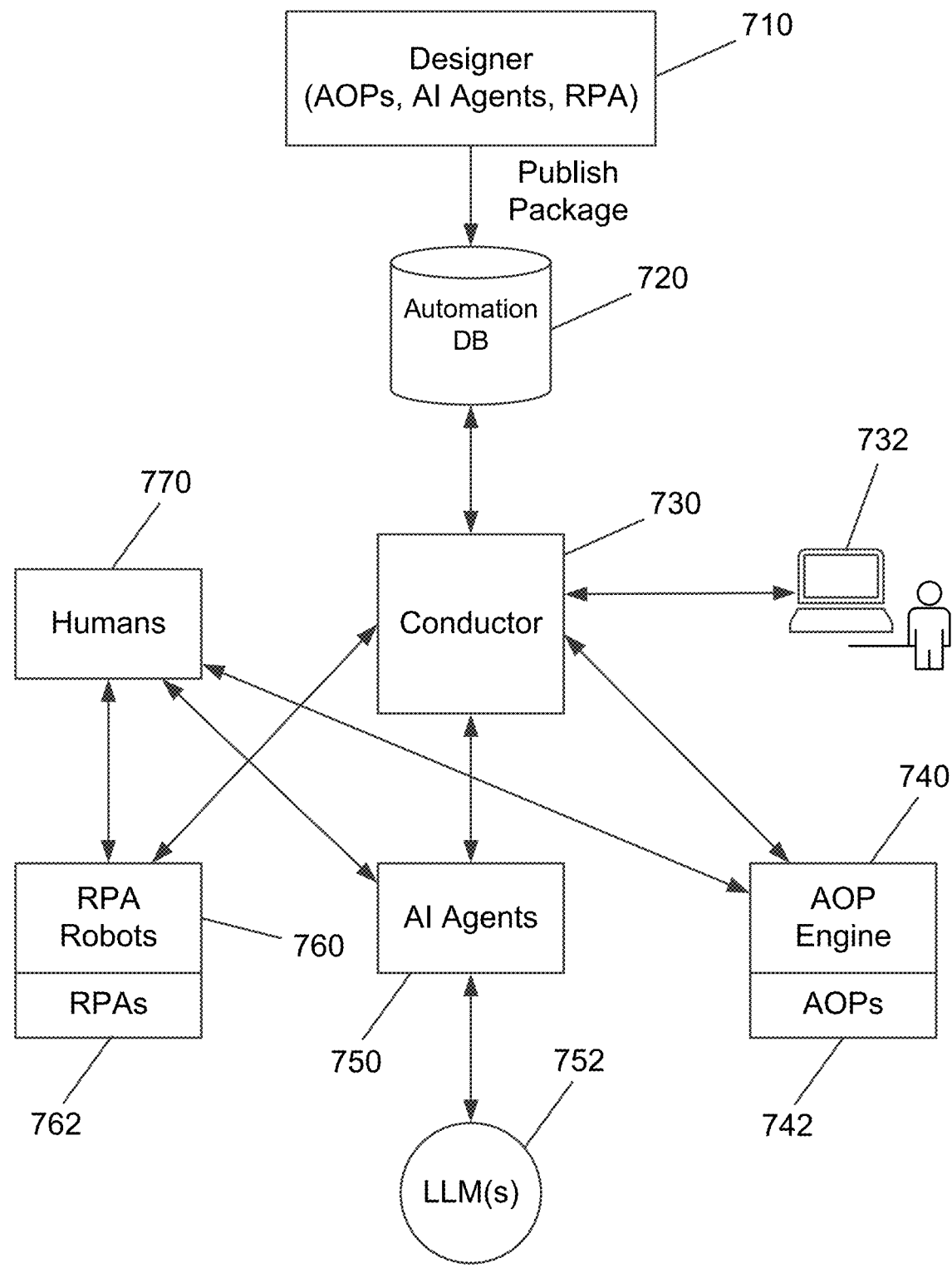
FIG. 7 illustrates an end-to-end AI agent, RPA robot, and AOP development and deployment system, according to an embodiment of the present invention.

FIG. 7 illustrates an end-to-end AI agent, RPA robot, and AOP development and deployment system 700, according to an embodiment of the present invention. A designer application 710 allows developers to design AOPs, AI agents, and RPA workflows. Once these have been tested and validated, they are packaged and published to an automation database 720.

A conductor application 730 manages deployments of these automations, as well as of AOPs, AI agents, and RPA robots. When a human user or software process 732 requests that an AOP be run, conductor application 730 sends a start job request to AOP engine 740, which selects and starts the appropriate automation from AOPs 742. When executing AOP 742, steps may be encountered that are implemented by AI agents 750 or RPA robots 760. When this occurs, AOP engine 740 suspends the AOP workflow execution and sends a request to conductor application 730 to send a start job request to an appropriate AI agent 750 or RPA robot 760 to execute the step.

In the case of an AI agent being requested, conductor application 730 sends the start job request to the appropriate AI agent 750. This request may include natural language text or other information provided by AOP engine 740 to conductor application 730. AI agent 750 then performs the step by executing an LLM 752 to assist in carrying out the task. AI agent 750 then sends information pertinent to the task (e.g., requested information, an indication that the step was completed, an indication that the step failed, etc.) to conductor 730, which provides this information to AOP engine 740. AOP engine 740 then resumes its operation.

In the case of an RPA robot being requested, conductor application 730 sends the start job request to the appropriate RPA robot 760. RPA robot 760 then executes a requested RPA 762. RPA robot 760 then sends information pertinent to the task (e.g., requested information, an indication that the step was completed, an indication that the step failed, etc.) to conductor 730, which provides this information to AOP engine 740. AOP engine 740 then resumes its operation.

In some cases, human action may be required by an AOP 742, an AI agent 750, or an RPA 762. In this case, AOP engine 740, AI agent 750, or RPA robot 760 contacts a human 770 for the human-in-the-loop portion of the automation. After the human completes the task, the AOP engine 740, AI agent 750, or RPA robot 760 resumes the automated portion of the automation.

Figure 8:
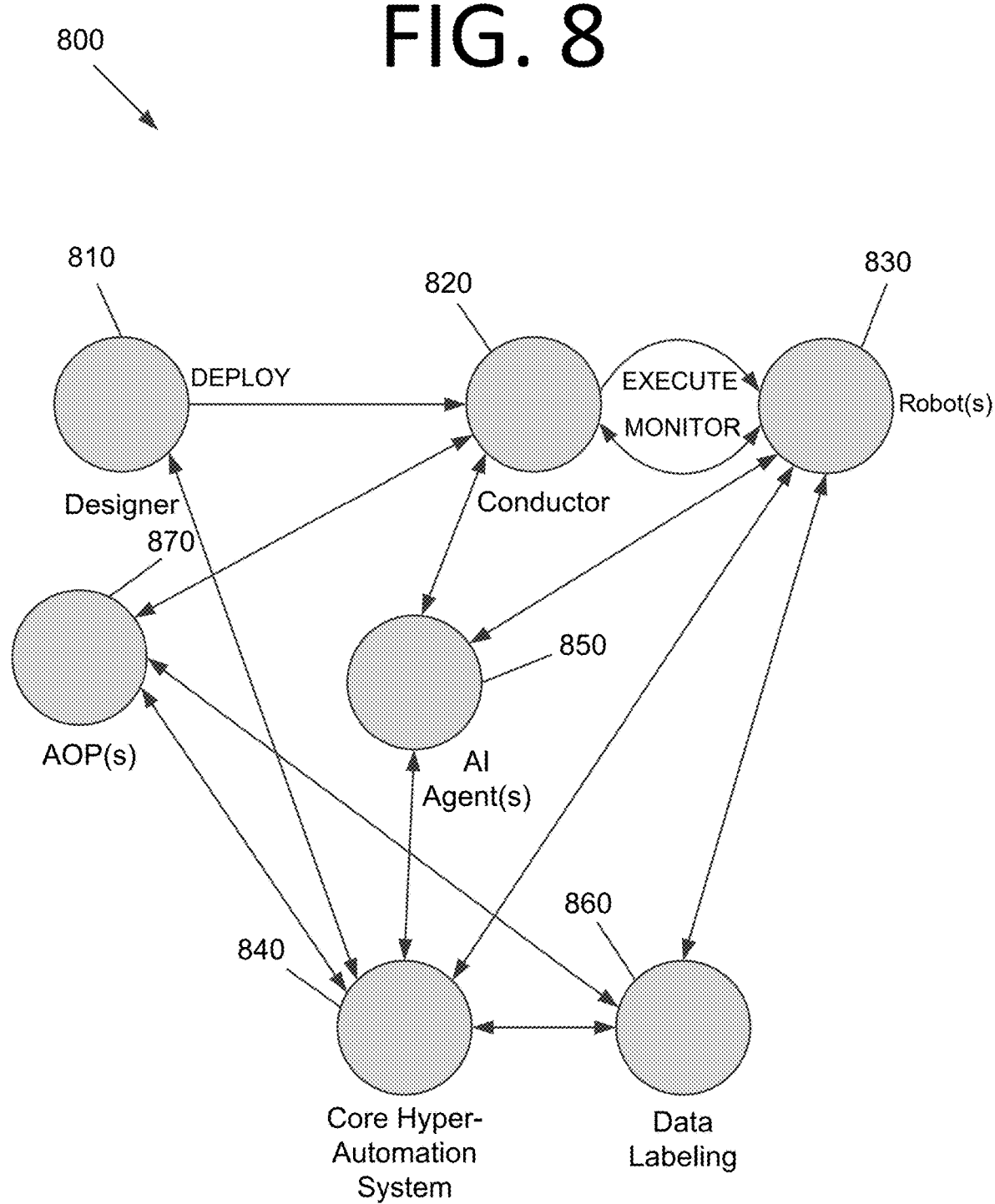
FIG. 8 is an architectural diagram illustrating an agentic automation and RPA system, according to an embodiment of the present invention.

FIG. 8 is an architectural diagram illustrating an agentic automation and RPA system 800, according to an embodiment of the present invention. In some embodiments, agentic automation and RPA system 800 is part of hyperautomation system 100 of FIG. 1. Agentic automation and RPA system 800 includes a designer 810 that allows a developer to design automations for AI agents and RPA robots (e.g., workflows, natural language instructions for AI agents, context grounding, tool configurations, etc.). Designer 810 may provide a solution for application integration, as well as automating third-party applications, administrative Information Technology (IT) tasks, and business IT processes. Designer 810 may facilitate development of an automation project, which is a graphical representation of a business process. Simply put, designer 810 facilitates the development and deployment of automations for RPA robots and AI agents. In some embodiments, designer 810 may be an application that runs on a user's desktop, an application that runs remotely in a VM, a web application, etc.

The automation project enables automation of rule-based processes by giving the developer control of the execution order and the relationship between a custom set of steps developed in a workflow, i.e., "activities," per the above. One commercial example of an embodiment of designer 810 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable for more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow and/or other configuration for an AI agent is developed in designer 810, execution of business processes is orchestrated by conductor 820, which orchestrates one or more robots 830, one or more AI agents 850, and/or one or more AOPs 870 that execute the workflows developed in designer 810. One commercial example of an embodiment of conductor 820 is UiPath Orchestrator™. Conductor 820 facilitates management of the creation, monitoring, and deployment of resources in an environment. Conductor 820 may act as an integration point with third-party solutions and applications. Per the above, in some embodiments, conductor 820 may be part of core hyperautomation system 120 of FIG. 1.

It should be noted that RPA robots 830 may operate independently for deterministic processes. AI agents 850 and AOPs 870 can also operate independently (e.g., for non-deterministic processes), or utilize RPA robot(s) 830 or other AI agents 850 as tools to accomplish part of their agentic automations. AI agents 850 can drive composite automations that utilize both RPA robots 830 and AI agents 850, or vice versa, and AOPs 870 may include such composite automations.

Conductor 820 may manage a fleet of robots 830 and AI agents 850, connecting and executing RPA robots 830 and AI agents 850 from a centralized point (e.g., as requested by an AOP engine that is implementing an AOP). Types of RPA robots 830 that may be managed include, but are not limited to, attended robots, unattended robots, development robots (similar to unattended robots, but used for development and testing purposes), and nonproduction robots (similar to attended robots, but used for development and testing purposes). Attended robots are triggered by user events and operate alongside a human on the same computing system. Attended robots may be used with conductor 820 for a centralized process deployment and logging medium. Attended robots may help the human user accomplish various tasks and may be triggered by user events. In some embodiments, processes cannot be started from conductor 820 on this type of robot and/or they cannot run under a locked screen. In certain embodiments, attended robots can only be started from a robot tray or from a command prompt. Attended robots should run under human supervision in some embodiments.

Unattended robots run unattended in virtual environments and can automate many processes. Unattended robots may be responsible for remote execution, monitoring, scheduling, and providing support for work queues. Debugging for all robot types may be run in designer 810 in some embodiments. Both attended and unattended robots may automate various systems and applications including, but not limited to, mainframes, web applications, VMs, enterprise applications (e.g., those produced by SAP®, Salesforce®, Oracle®, etc.), and computing system applications (e.g., desktop and laptop applications, mobile device applications, wearable computer applications, etc.).

Conductor 820 may have various capabilities including, but not limited to, provisioning, deployment, configuration, queueing, monitoring, logging, and/or providing interconnectivity. Provisioning may include creating and maintenance of connections between robots 830, AI agents 850, and/or AOPs 870 and conductor 820 (e.g., a web application). Deployment may include assuring the correct delivery of package versions to assigned robots 830, AI agents 850, and/or AOPs for execution. Configuration may include maintenance and delivery of RPA robot and AI agent environments and process configurations. Queueing may include providing management of queues and queue items. Monitoring may include keeping track of robot and AI agent identification data and maintaining user permissions. Logging may include storing and indexing logs to a database (e.g., a structured query language (SQL) database or a "not only" SQL (NoSQL) database) and/or another storage mechanism (e.g., ElasticSearch®, which provides the ability to store and quickly query large datasets). Conductor 820 may provide interconnectivity by acting as the centralized point of communication for third-party solutions and/or applications.

Robots 830 are execution agents that implement workflows built in designer 810. One commercial example of some embodiments of robot(s) 830 is UiPath Robots™. In some embodiments, RPA robots 830 install the Microsoft Windows® Service Control Manager (SCM)-managed service by default. As a result, such RPA robots 830 can open interactive Windows® sessions under the local system account, and have the rights of a Windows® service.

In some embodiments, RPA robots 830 can be installed in a user mode. For such robots 830, this means they have the same rights as the user under which a given RPA robot 830 has been installed. This feature may also be available for high density (HD) robots, which ensure full utilization of each machine at its maximum potential. In some embodiments, any type of RPA robot 830 may be configured in an HD environment.

RPA robots 830 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 820 and the execution hosts (i.e., the computing systems on which robots 830 are executed). These services are trusted with and manage the credentials for RPA robots 830. A console application is launched by the SCM under the local system.

User mode robot services in some embodiments manage and monitor Windows® sessions and act as a proxy between conductor 820 and the execution hosts. User mode robot services may be trusted with and manage the credentials for RPA robots 830. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Note that these agents differ from AI agents 850. Agents may be a client of the service and may request to start or stop jobs and change settings. The command line is a client of the service. The command line is a console application that can request to start jobs and wait for their output.

Having components of robots 830 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 810 may also be independent of browser zoom level in some embodiments. For applications that are DPI-unaware or intentionally marked as unaware, DPI may be disabled in some embodiments.

Agentic automation and RPA system 800 in this embodiment is part of a hyper-automation system, such as hyper-automation system 100 of FIG. 1. Developers may use designer 810 to build and test RPAs, AOPs, and AI agents that utilize AI/ML models deployed in core hyper-automation system 840 (e.g., as part of an AI center thereof). Such RPA robots may send input for execution of the AI/ML model(s) and receive output therefrom via core hyper-automation system 840.

One or more of RPA robots 830 may be listeners, as described above. These listeners may provide information to core hyper-automation system 840 regarding what users are doing when they use their computing systems. This information may then be used by core hyper-automation system for process mining, task mining, task capture, etc.

An assistant/chatbot (not shown) may be provided on user computing systems to allow users to launch RPA local robots. The assistant/chatbot may be located in a system tray, for example. Chatbots may have a user interface so users can see text in the chatbot. Alternatively, chatbots may lack a user interface and run in the background, listening using the computing system's microphone for user speech.

In some embodiments, data labeling may be performed by a user of the computing system on which an RPA robot or AI agent is executing or on another computing system that the robot or AI agent provides information to. For instance, if a robot calls an AI/ML model that performs CV on images for VM users, but the AI/ML model does not correctly identify a button on the screen, the user may draw a rectangle around the misidentified or non-identified component and potentially provide text with a correct identification. This information may be provided to core hyper-automation system 840 and then used later for training a new version of the AI/ML model.

Figure 9:
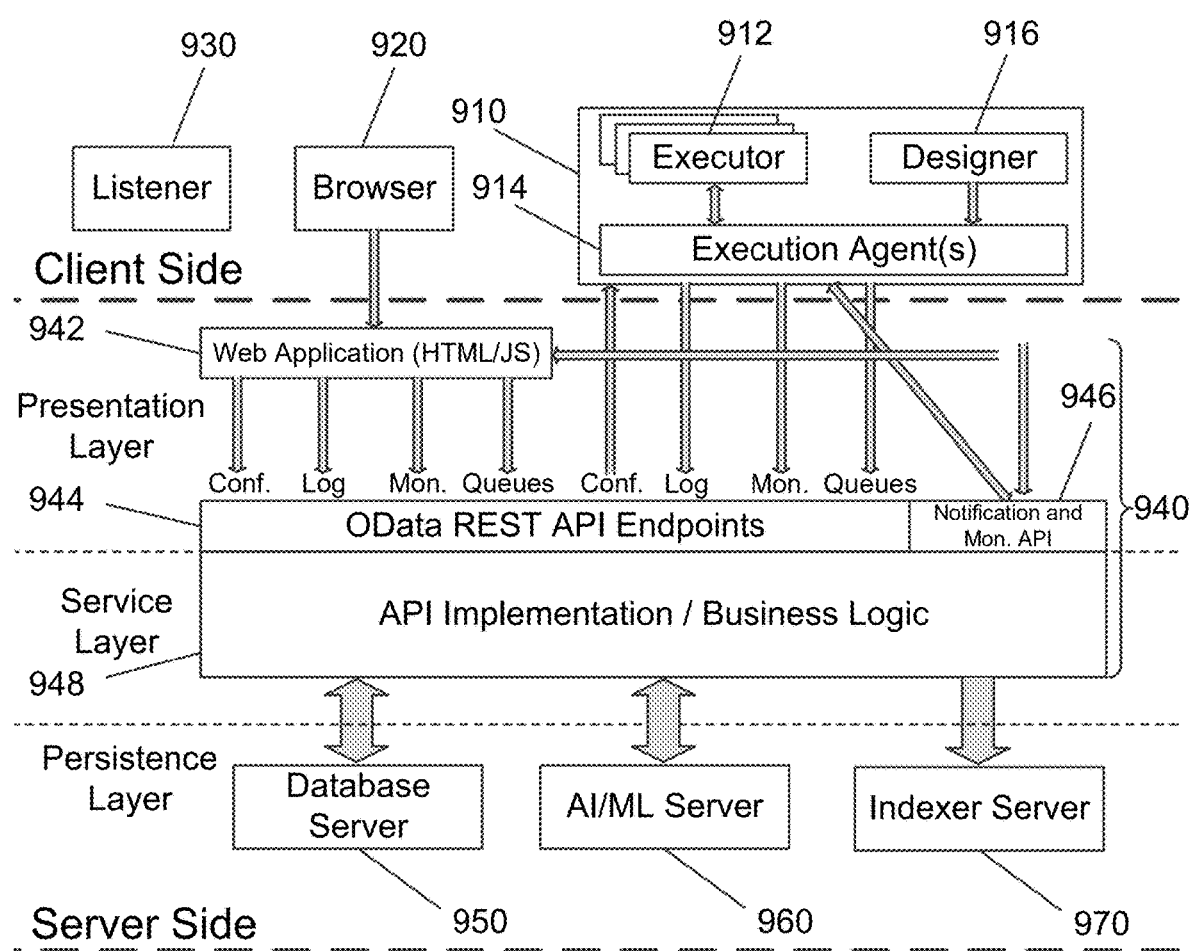
FIG. 9 is an architectural diagram illustrating a deployed RPA system, according to an embodiment of the present invention.

FIG. 9 is an architectural diagram illustrating a deployed RPA system 900, according to an embodiment of the present invention. In some embodiments, RPA system 900 may be a part of agentic automation and RPA system 800 of FIG. 8 and/or hyper-automation system 100 of FIG. 1. It should be noted that the architecture of deployed RPA system 900 may not be used in some embodiments. Deployed RPA system 900 may be a cloud-based system, an on-premises system, a desktop-based system that offers enterprise level, user level, or device level automation solutions for automation of different computing processes, etc.

It should be noted that the client side, the server side, or both, may include any desired number of computing systems without deviating from the scope of the invention. On the client side, a robot application 910 includes executors 912, an execution agent 914, and a designer 916. However, in some embodiments, designer 916 may not be running on the same computing system as executors 912 and execution agent 914. Executors 912 are running processes. Several business projects may run simultaneously. Execution agent 914 (e.g., a Windows® service) is the single point of contact for all executors 912 in this embodiment. All messages in this embodiment are logged into conductor 940, which processes them further via database server 950, an AI/ML server 960, an indexer server 970, or any combination thereof. As discussed above with respect to FIG. 8, executors 912 may be robot components.

In some embodiments, an RPA robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Execution agent 914 is also responsible for sending the status of the robot (e.g., periodically sending a "heartbeat" message indicating that the robot is still functioning) and downloading the required version of the package to be executed. The communication between execution agent 914 and conductor 940 is always initiated by execution agent 914 in some embodiments. In the notification scenario, execution agent 914 may open a WebSocket channel that is later used by conductor 940 to send commands to the robot (e.g., start, stop, etc.).

It should be noted that, while not shown here in order to reduce clutter in FIG. 9, AI agents can also interact with conductor 940, as discussed above with respect to FIGS. 1 and 8, for example. Conductor 940 may orchestrate the operations of the AI agents. Conductor 940 may also facilitate interaction between the AI agents and AI/ML models via AI/ML server 960, which may store and/or facilitate access to generative AI models.

A listener 930 monitors and records data pertaining to user interactions with an attended computing system and/or operations of an unattended computing system on which listener 930 resides. Listener 930 may be an RPA robot, part of an operating system, a downloadable application for the respective computing system, or any other software and/or hardware without deviating from the scope of the invention. Indeed, in some embodiments, the logic of the listener is implemented partially or completely via physical hardware.

On the server side, a presentation layer (web application 942, Open Data Protocol (oData) Representative State Transfer (REST) Application Programming Interface (API) endpoints 944, and notification and monitoring 946), a service layer (API implementation/business logic 948), and a persistence layer (database server 950, AI/ML server 960, and indexer server 970) are included. Conductor 940 includes web application 942, oData REST API endpoints 944, notification and monitoring 946, and API implementation/business logic 948. In some embodiments, most actions that a user performs in the interface of conductor 940 (e.g., via browser 920) are performed by calling various APIs. Such actions may include, but are not limited to, starting jobs on robots, adding/removing data in queues, scheduling jobs to run unattended, etc. without deviating from the scope of the invention. Web application 942 is the visual layer of the server platform. In this embodiment, web application 942 uses Hypertext Markup Language (HTML) and JavaScript (JS). However, any desired markup languages, script languages, or any other formats may be used without deviating from the scope of the invention. The user interacts with web pages from web application 942 via browser 920 in this embodiment in order to perform various actions to control conductor 940. For instance, the user may create robot groups, assign packages to the robots, analyze logs per robot and/or per process, start and stop robots, etc.

In addition to web application 942, conductor 940 also includes service layer that exposes oData REST API endpoints 944. However, other endpoints may be included without deviating from the scope of the invention. The REST API is consumed by both web application 942 and execution agent 914. Execution agent 914 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job request is used in conductor 940. Queueing REST endpoints may be responsible for queues and queue item management, such as adding data to a queue, obtaining a transaction from the queue, setting the status of a transaction, etc.

Monitoring REST endpoints may monitor web application 942 and execution agent 914. Notification and monitoring API 946 may be REST endpoints that are used for registering execution agent 914, delivering configuration settings to execution agent 914, and for sending/receiving notifications from the server and execution agent 914. Notification and monitoring API 946 may also use WebSocket communication in some embodiments.

The APIs in the service layer may be accessed through configuration of an appropriate API access path in some embodiments, e.g., based on whether conductor 940 and an overall hyper-automation system have an on-premises deployment type or a cloud-based deployment type. APIs for conductor 940 may provide custom methods for querying stats about various entities registered in conductor 940. Each logical resource may be an oData entity in some embodiments. In such an entity, components such as the robot, process, queue, etc., may have properties, relationships, and operations. APIs of conductor 940 may be consumed by web application 942 and/or execution agents 914 in two ways in some embodiments: (1) by getting the API access information from conductor 940; or (2) by registering an external application to use the oAuth flow.

The persistence layer includes a trio of servers in this embodiment-database server 950 (e.g., a SQL server), AI/ML server 960 (e.g., a server providing AI/ML model serving services, such as AI center functionality) and indexer server 970. Database server 950 in this embodiment stores the configurations of the robots and AI agents, robot and AI agent groups, AOPs, associated processes, users, roles, schedules, etc. This information is managed through web application 942 in some embodiments. Database server 950 may manage queues and queue items. In some embodiments, database server 950 may store messages logged by the robots and AI agents (in addition to or in lieu of indexer server 970). Database server 950 may also store process mining, task mining, and/or task capture-related data, received from listener 930 installed on the client side, for example. While no arrow is shown between listener 930 and database 950, it should be understood that listener 930 is able to communicate with database 950, and vice versa in some embodiments. This data may be stored in the form of PDDs, images, XAML files, etc. It should be noted that structured and/or unstructured data may be stored. Listener 930 may be configured to intercept user actions, processes, tasks, and performance metrics on the respective computing system on which listener 930 resides. For example, listener 930 may record user actions (e.g., clicks, typed characters, locations, applications, active elements, times, etc.) on its respective computing system and then convert these into a suitable format to be provided to and stored in database server 950.

AI/ML server 960 facilitates incorporation of AI/ML models into automations. Pre-built AI/ML models, model templates, and various deployment options may make such functionality accessible even to those who are not data scientists. Deployed automations (e.g., RPA robots and/or AI agents) may call AI/ML models from AI/ML server 960. Performance of the AI/ML models may be monitored and be trained and improved using human-validated data. AI/ML server 960 may schedule and execute training jobs to train new versions of the AI/ML models. AI/ML model server may also store and/or access generative AI models.

AI/ML server 960 may store data pertaining to AI/ML models and ML packages for configuring various ML skills for a user at development time. An ML skill, as used herein, is a pre-built and trained ML model for a process, which may be used by an automation, for example. AI/ML server 960 may also store data pertaining to document understanding technologies and frameworks, algorithms and software packages for various AI/ML capabilities including, but not limited to, intent analysis, NLP, speech analysis, different types of AI/ML models, etc.

Indexer server 970, which is optional in some embodiments, stores and indexes the information logged by the robots. In certain embodiments, indexer server 970 may be disabled through configuration settings. In some embodiments, indexer server 970 uses ElasticSearch®, which is an open source project full-text search engine. Messages logged by robots (e.g., using activities like log message or write line) may be sent through the logging REST endpoint(s) to indexer server 970, where they are indexed for future utilization.

Figure 10:
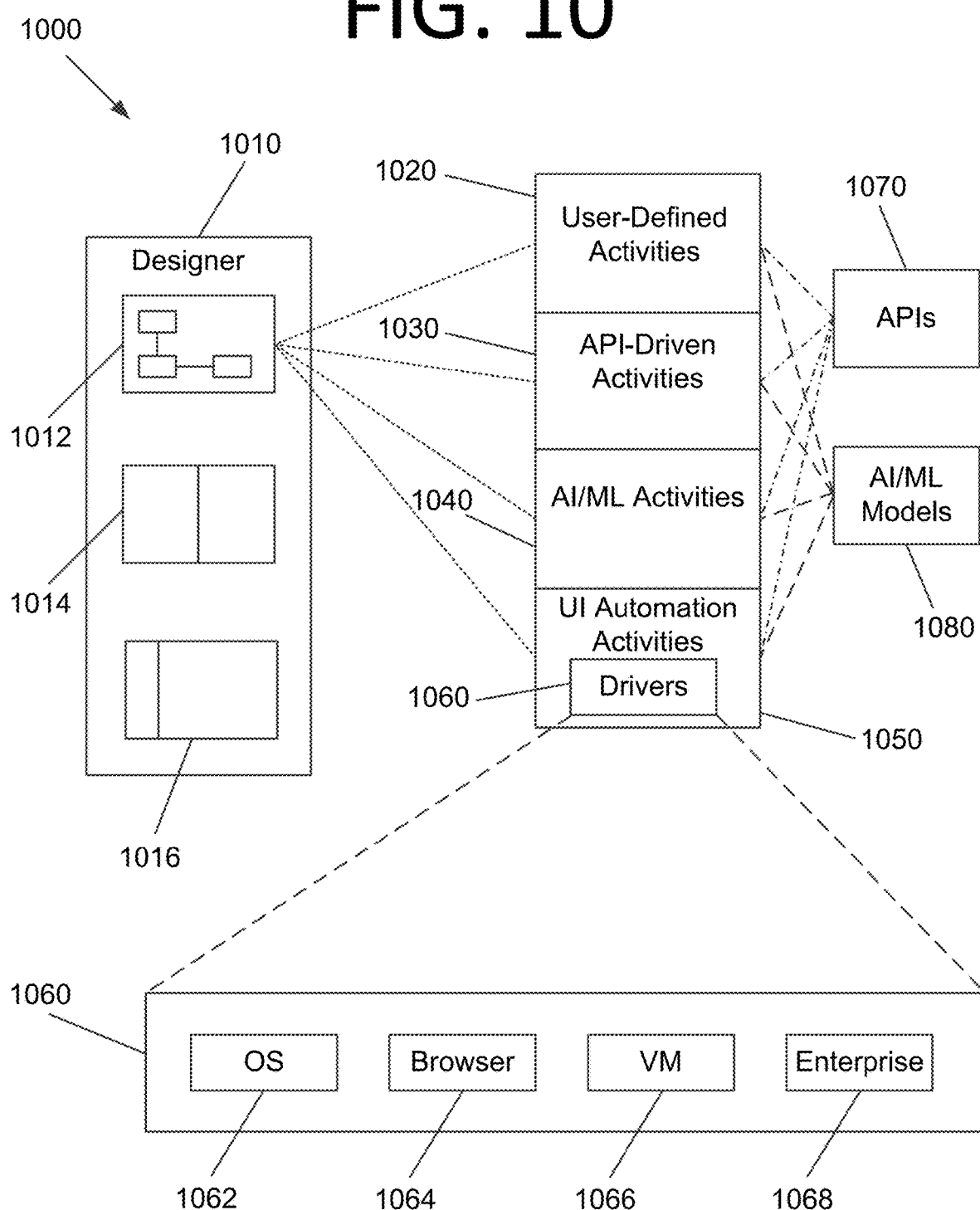
FIG. 10 is an architectural diagram illustrating the relationship between a designer, activities, and drivers, according to an embodiment of the present invention.

FIG. 10 is an architectural diagram illustrating the relationship 1000 between a designer 1010, activities 1020, 1030, 1040, 1050, drivers 1060, APIs 1070, and AI/ML models 1080, according to an embodiment of the present invention. Per the above, a developer uses designer 1010 to develop workflows and automations that are executed by RPA robots, AI agents, and AOP engines. The developer can design and configure RPA robot workflows 1012, design and configure agentic automations 1014 for AI agents (e.g., providing natural language descriptions, context grounding, tools, etc. for AI agents), and design and configure AOPs 1016. See FIGS. 4A, 4B, 5, and 6, for example. The various types of activities may be displayed to the developer in some embodiments. Designer 1010 may be local to the user's computing system or remote thereto (e.g., accessed via VM or a local web browser interacting with a remote web server). Workflows for RPA robots may include user-defined activities 1020, API-driven activities 1030, AI/ML activities 1040, and/or UI automation activities 1050. User-defined activities 1020 and API-driven activities 1040 interact with applications via their APIs. User-defined activities 1020 and/or AI/ML activities 1040 may call one or more AI/ML models 1080 in some embodiments, which may be located locally to the computing system on which the robot is operating and/or remotely thereto.

Some embodiments are able to identify non-textual visual components in an image, which is called CV herein. However, it should be noted that in some embodiments, CV incorporates OCR. CV may be performed at least in part by AI/ML model(s) 1080. Some CV activities pertaining to such components may include, but are not limited to, extracting of text from segmented label data using OCR, fuzzy text matching, cropping of segmented label data using ML, comparison of extracted text in label data with ground truth data, etc. In some embodiments, there may be hundreds or even thousands of activities that may be implemented in user-defined activities 1020. However, any number and/or type of activities may be used without deviating from the scope of the invention.

UI automation activities 1050 are a subset of special, lower-level activities that are written in lower-level code and facilitate interactions with the screen. UI automation activities 1050 facilitate these interactions via drivers 1060 that allow the robot to interact with the desired software. For instance, drivers 1060 may include operating system (OS) drivers 1062, browser drivers 1064, VM drivers 1066, enterprise application drivers 1068, etc. One or more of AI/ML models 1080 may be used by UI automation activities 1050 in order to perform interactions with the computing system in some embodiments. In certain embodiments, AI/ML models 1080 may augment drivers 1060 or replace them completely. Indeed, in certain embodiments, drivers 1060 are not included.

Drivers 1060 may interact with the OS at a low level looking for hooks, monitoring for keys, etc. via OS drivers 1062. Drivers 1060 may facilitate integration with Chrome®, IER, Citrix®, SAP®, etc. For instance, the "click" activity performs the same role in these different applications via drivers 1060.

Figure 11:
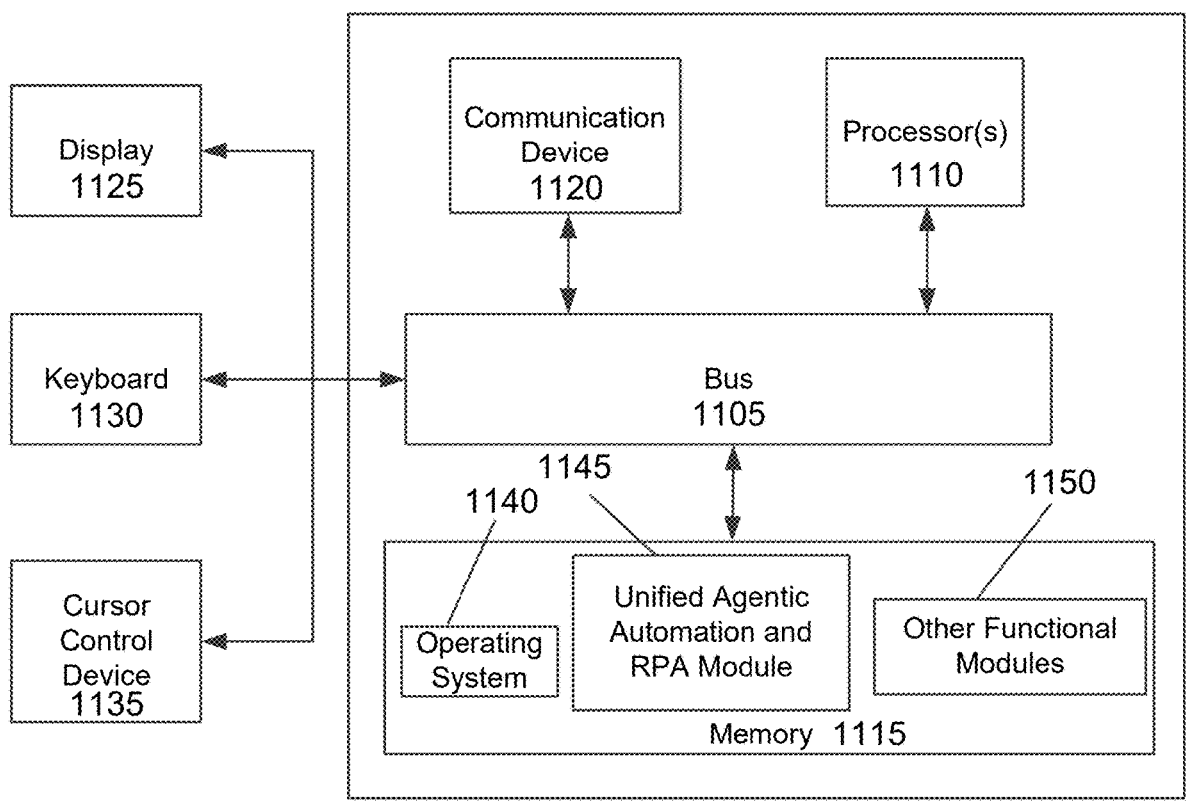
FIG. 11 is an architectural diagram illustrating a computing system configured to perform unified agentic automation and RPA, according to an embodiment of the present invention.

FIG. 11 is an architectural diagram illustrating a computing system 1100 configured to perform unified agentic automation and RPA, according to an embodiment of the present invention. In some embodiments, computing system 1100 may be one or more of the computing systems depicted and/or described herein. In certain embodiments, computing system 1100 may be part of a hyper-automation system, such as that shown in FIGS. 1 and 8. Computing system 1100 includes a bus 1105 or other communication mechanism for communicating information, and processor(s) 1110 coupled to bus 1105 for processing information. Processor(s) 1110 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1110 may also have multiple processing cores, and at least some of the cores may be configured to perform specific functions. Multi-parallel processing may be used in some embodiments. In certain embodiments, at least one of processor(s) 1110 may be a neuromorphic circuit that includes processing elements that mimic biological neurons. In some embodiments, neuromorphic circuits may not require the typical components of a Von Neumann computing architecture.

Computing system 1100 further includes a memory 1115 for storing information and instructions to be executed by processor(s) 1110. Memory 1115 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 1110 and may include volatile media, non-volatile media, or both. The media may also be removable, non-removable, or both. Computing system 1100 includes a communication device 1120, such as a transceiver, to provide access to a communications network via a wireless and/or wired connection. In some embodiments, communication device 1120 may include one or more antennas that are singular, arrayed, phased, switched, beamforming, beamsteering, a combination thereof, and/or any other antenna configuration without deviating from the scope of the invention.

Processor(s) 1110 are further coupled via bus 1105 to a display 1125. Any suitable display device and haptic I/O may be used without deviating from the scope of the invention. A keyboard 1130 and a cursor control device 1135, such as a computer mouse, a touchpad, etc., are further coupled to bus 1105 to enable a user to interface with computing system 1100. However, in certain embodiments, a physical keyboard and mouse may not be present, and the user may interact with the device solely through display 1125 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1115 stores software modules that provide functionality when executed by processor(s) 1110. The modules include an operating system 1140 for computing system 1100. The modules further include a unified agentic automation and RPA module 1145 that is configured to perform all or part of the processes described herein or derivatives thereof. Computing system 1100 may include one or more additional functional modules 1150 that include additional functionality.

One skilled in the art will appreciate that a "computing system" could be embodied as a server, an embedded computing system, a personal computer, a console, a personal digital assistant (PDA), a mobile phone, a tablet computing device, a smart watch, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a LAN, a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 12A:
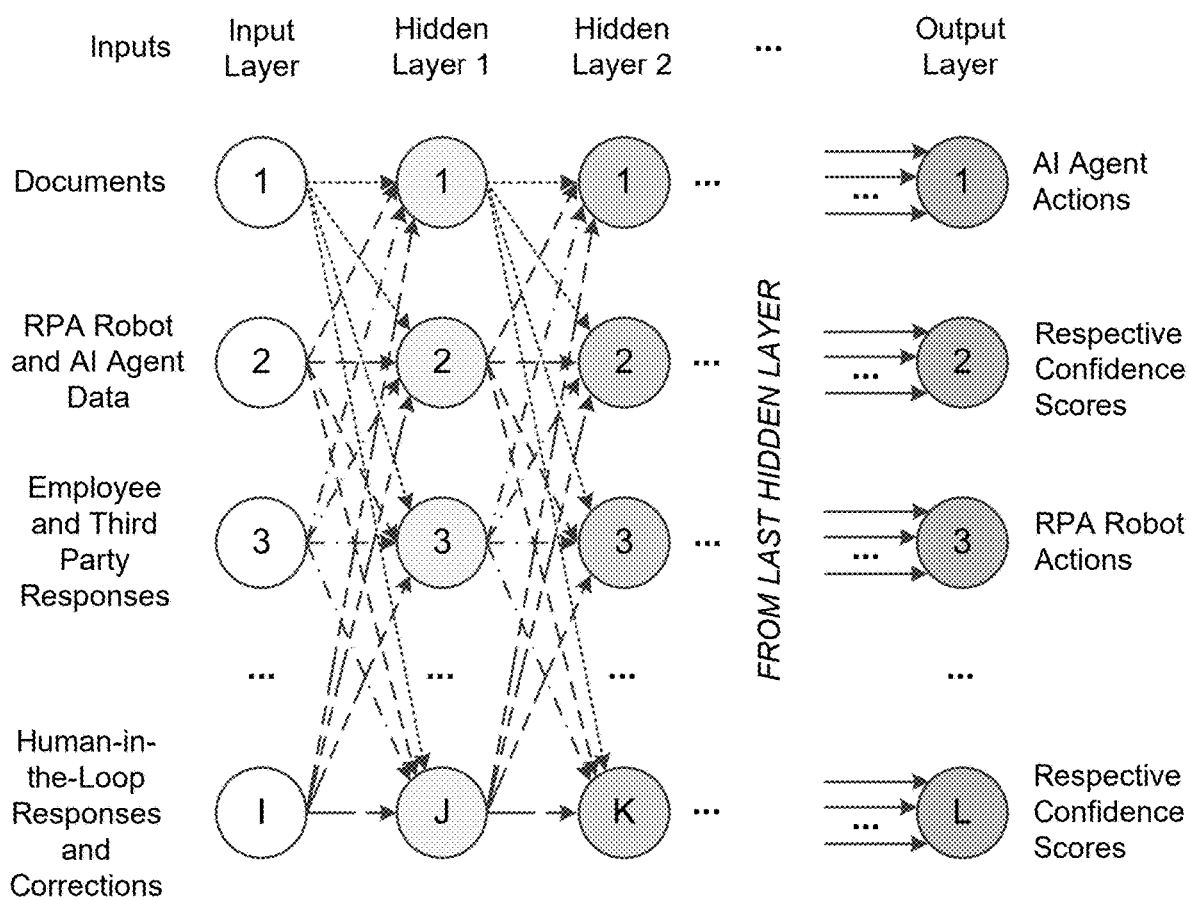
FIG. 12A illustrates an example of a neural network that has been trained to supplement unified solutions for agentic automation and RPA with self-healing and capabilities to increase autonomy, according to an embodiment of the present invention.

Various types of AI/ML models may be trained and deployed without deviating from the scope of the invention. For instance, FIG. 12A illustrates an example of a neural network 1200 that has been trained to supplement unified solutions for agentic automation and RPA with self-healing and capabilities to increase autonomy, according to an embodiment of the present invention. Neural network 1200 includes a number of hidden layers. Both DLNNs and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 1200.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 12A, documents analyzed by RPA robots and/or AI agents, data from previous execution of RPA robots and AI agents, employee and third party responses (e.g., email communications, corrections to documents, system adjustments, etc.), human-in-the-loop responses and corrections for AI agent processes, etc. are provided as the input layer and fed as inputs to the J neurons of hidden layer 1. Various other inputs are possible, including, but not limited to, computing system state information, published automations, business rules, information regarding what RPA workflows and/or tasks pertain to, initial definitions of automations, process automation documents, etc. While all of these inputs are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. While multiple suggestions are shown here as output, in some embodiments, only a single output suggestion is provided. In certain embodiments, the suggestions are ranked based on confidence scores. In this embodiment, the outputs are AI agent actions and RPA robot actions with respective confidence scores. These actions may include, but are not limited to, determining another AI agent or RPA robot to trigger, determining a software application to interact with, attempting to resolve a problem with a human or a software application, requesting assistance from a human-in-the-loop, etc.

It should be noted that numbers of neurons I, J, K, and L are not necessarily equal. Thus, any desired number of layers may be used for a given layer of neural network 1200 without deviating from the scope of the invention. Indeed, in certain embodiments, the types of neurons in a given layer may not all be the same.

Neural network 1200 is trained to assign confidence score(s) to appropriate outputs. In order to reduce predictions that are inaccurate, only those results with a confidence score that meets or exceeds a confidence threshold may be provided in some embodiments. For instance, if the confidence threshold is 80%, outputs with confidence scores exceeding this amount may be used and the rest may be ignored.

Neural networks are probabilistic constructs that typically have confidence score(s). This may be a score learned by the AI/ML model based on how often a similar input was correctly identified during training. Some common types of confidence scores include a decimal number between 0 and 1 (which can be interpreted as a confidence percentage as well), a number between negative ∞ and positive ∞, a set of expressions (e.g., "low," "medium," and "high"), etc. Various post-processing calibration techniques may also be employed in an attempt to obtain a more accurate confidence score, such as temperature scaling, batch normalization, weight decay, negative log likelihood (NLL), etc.

"Neurons" in a neural network are implemented algorithmically as mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 12B:
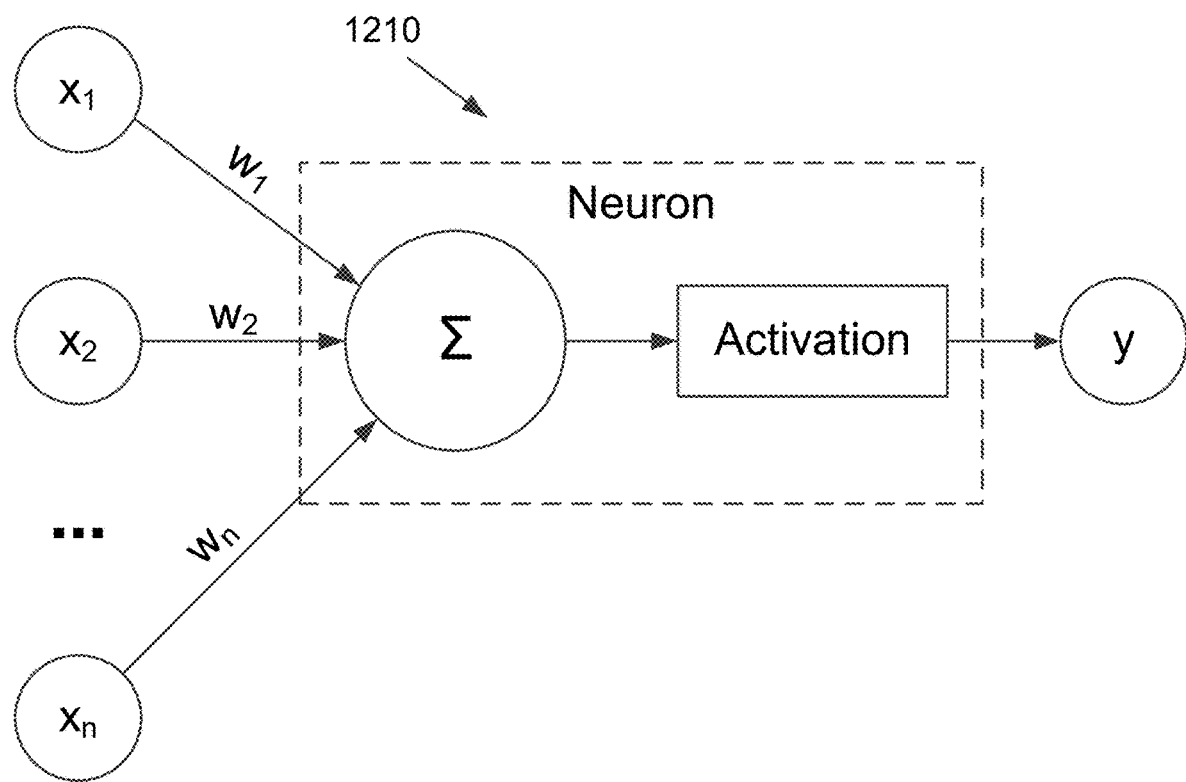
FIG. 12B illustrates an example of a neuron, according to an embodiment of the present invention.

An example of a neuron 1210 is shown in FIG. 12B. Inputs $x_1, x_2, \ldots, x_n$ from a preceding layer are assigned respective weights $w_1, w_2, \ldots, W_n$. Thus, the collective input from preceding neuron 1 is $w_1x_1$. These weighted inputs are used for the neuron's summation function modified by a bias, such as:

$$\sum_{i=1}^{m}(w_ix_i)+\text{bias} \quad (1)$$

This summation is compared against an activation function $f(x)$ to determine whether the neuron "fires". For instance, $f(x)$ may be given by:

$$f(x) = \begin{cases} 1 \text{ if } \sum wx + \text{bias} \geq 0 \\ 0 \text{ if } \sum wx + \text{bias} < 0 \end{cases} \quad (2)$$

The output y of neuron 1210 may thus be given by:

$$y = f(x)\sum_{i=1}^{m}(w_ix_i)+\text{bias} \quad (3)$$

In this case, neuron 1210 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

A goal, or "reward function," is often employed. A reward function explores intermediate transitions and steps with both short-term and long-term rewards to guide the search of a state space and attempt to achieve a goal (e.g., finding the most accurate answers to user inquiries based on associated metrics). During training, various labeled data is fed through neural network 1200. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide corrections of incorrect predictions, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer $i=1, \ldots, N$ of the network, with the output at a given layer first multiplied by a synaptic matrix $W_i$, and with a bias vector $b_i$ added. The network output o, given by $$o=f_N(W_Nf_{N-1}(W_{N-1}f_{N-2}(\ldots f_1(W_1x+b_1)\ldots)+b_{N-1})+b_N) \quad (4)$$

In some embodiments, o is compared with a target output t, resulting in an $$E = \frac{1}{2}\|0 - t\|^2,$$

error, which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o--t. This global error is then propagated backwards giving local errors for weight updates with computations similar to, but not exactly the same as, those used for forward propagation. In particular, the backpropagation step typically requires an activity function of the form $p_j(n_j)=f_j'$ $(n_j)$, where $n_j$ is the network activity at layer j (i.e., $n_j = W_j o_{j-1} + b_j$) where $o_j = f_j(n_j)$ and the apostrophe 'denotes the derivative of the activity function $f$.

The weight updates may be computed via the formulae:

$$d_j = \begin{cases} (o-t) \circ p_j(n_j), & j = N \\ W_{j+1}^T d_{j+1} \circ p_j(n_j), & j < N \end{cases} \quad (5)$$

$$\frac{\partial E}{\partial W_{j+1}} = d_{j+1}(o_j)^T \quad (6)$$

$$\frac{\partial E}{\partial b_{j+1}} = d_{j+1} \quad (7)$$

$$W_j^{new} = W_j^{old} - \eta \frac{\partial E}{\partial W_j} \quad (8)$$

$$b_j^{new} = b_j^{old} - \eta \frac{\partial E}{\partial b_j} \quad (9)$$

where ° denotes a Hadamard product (i.e., the element-wise product of two vectors), T denotes the matrix transpose, and $o_j$ denotes $f_j(W_j o_{j-1}+b;)$, with $o_0=x$. Here, the learning rate n is chosen with respect to machine learning considerations. Below, n is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it performs well on the training data but does not perform well on other data.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model. In certain embodiments, a collection of trained AI/ML models may be used to accomplish a task. For example, one AI/ML model may be trained to recognize images, another may recognize text, yet another may recognize semantic and/or ontological associations, etc.

It should be noted that in addition to or in lieu of neural networks, some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

NLP models such as word2vec, BERT, GPT-3, ChatGPT, other LLMs, etc. may be used in some embodiments to facilitate semantic understanding and provide more accurate and human-like answers, per the above. Other techniques, such as clustering algorithms, may be used to find similarities between groups of elements. Clustering algorithms may include, but are not limited to, density-based algorithms, distribution-based algorithms, centroid-based algorithms, hierarchy-based algorithms. K-means clustering algorithms, the DBSCAN clustering algorithm, the Gaussian mixture model (GMM) algorithms, the balance iterative reducing and clustering using hierarchies (BIRCH) algorithm, etc. Such techniques may also assist with categorization.

Figure 13:
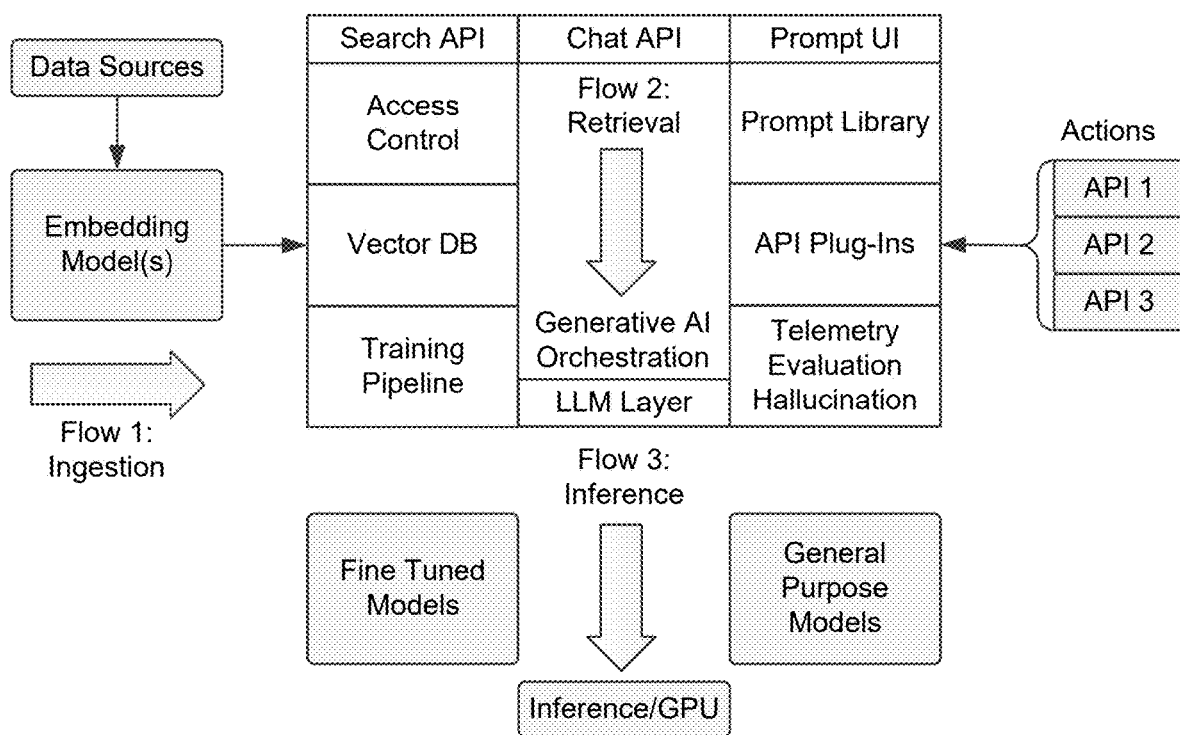
FIG. 13 is an architectural diagram illustrating a reference architecture for a generative AI model, according to an embodiment of the present invention.

FIG. 13 is an architectural diagram illustrating a reference architecture 1300 for a generative AI model, according to an embodiment of the present invention. The architecture consists of several layers: API plug-ins, a prompt library, vector data source ingestion, access processing control, a model-training pipeline, an assessment layer to assess hallucination/telemetry/evaluations, a BYOM embedding layer, and an LLM orchestration layer. There are also retrieval plug-ins, access control plug-ins, and API plug-ins that integrate into enterprise systems.

There are three main flows in this embodiment:
Data Ingestion and Training Flow: Data is read from multiple data stores, preprocessed, chunked, and trained through an embedding model (e.g., retrieval augmented generation (RAG)) and a training pipeline (i.e., fine-tuning). The vector database stores the chunked document embeddings that allow for better semantic, similarity-based data retrievals.
Prompt Augmentation Using Data Retrieval: Once a user query arrives at the API layer, the prompt is selected, followed by data retrievals through the vector database or API plug-ins to get the right contextual data before the prompt is passed to the LLM layer.
LLM Inference: This is where there is a choice to use general purpose foundation models from or a self-hosted foundation model. Fine-tuned models may be used when tuned for a specific task or use case. The response is evaluated for accuracy and other metrics, including hallucinations.

It should be noted that in some embodiments, a generative AI model with multiple "heads" may be used. Heads refer to output layers of the generative AI model. Generative AI models, such as generative AI models 172 in FIG. 1, typically have a sequence of layers, and each head will often share the first few layers of the model before diverging into their own distinct layers.

Figure 14:
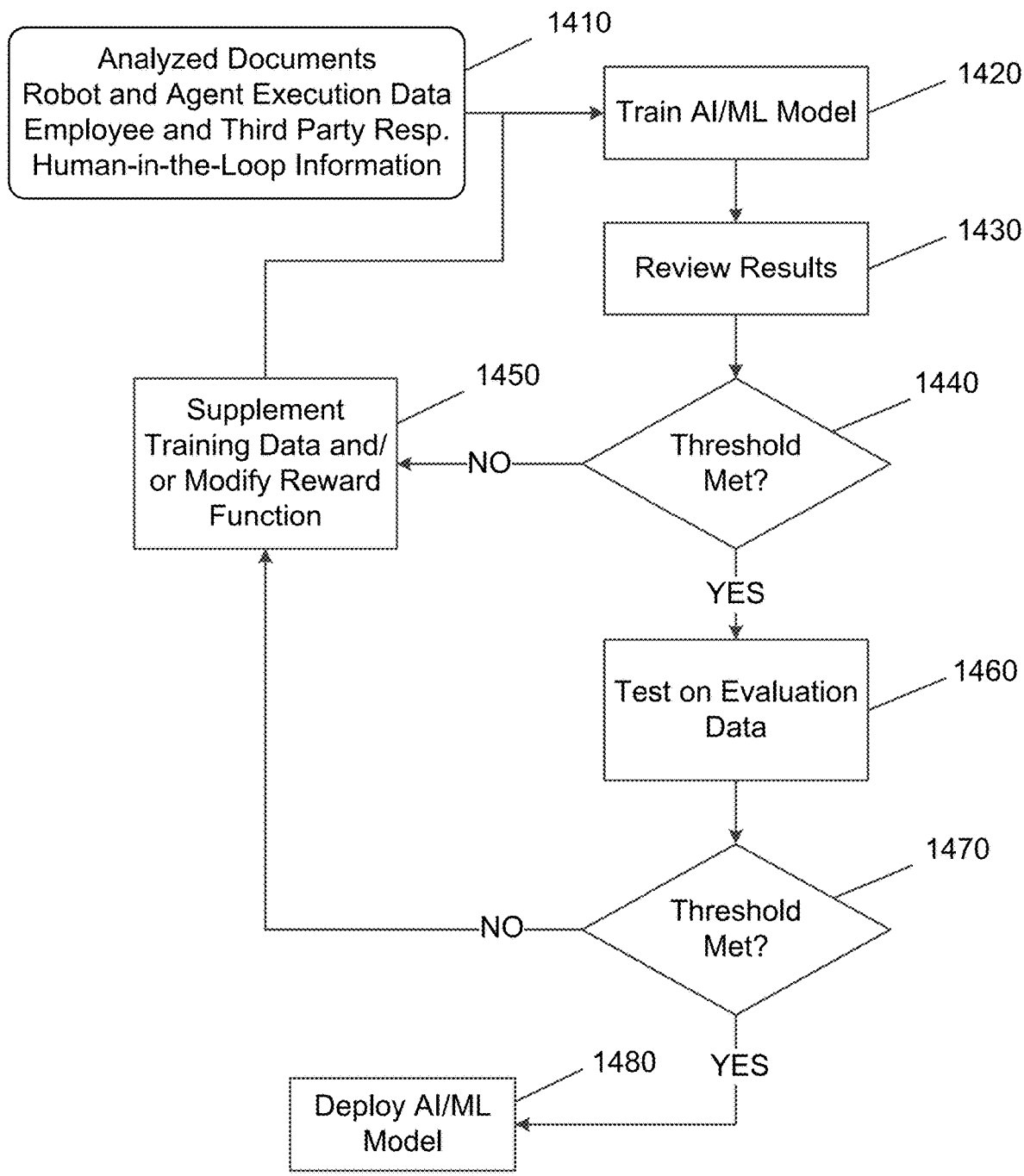
FIG. 14 is a flowchart illustrating a process for training AI/ML model(s), according to an embodiment of the present invention.

FIG. 14 is a flowchart illustrating a process 1400 for training AI/ML model(s), according to an embodiment of the present invention. In some embodiments, the AI/ML model (s) may be generative AI models, per the above. In the case of neural networks, the architecture typically includes multiple layers of neurons, including input, output, and hidden layers. See FIGS. 12A and 12B, for example. The hidden layers in between process the input data and generate intermediate representations of the input that are used to generate the output. These hidden layers can include various types of neurons, such as convolutional neurons, recurrent neurons, and/or transformer neurons. Generative AI models may also have various layers.

The training process in some embodiments begins with providing documents analyzed by RPA robots and/or AI agents, data from previous execution of RPA robots and AI agents, employee and third party responses (e.g., email communications, corrections to documents, system adjustments, etc.), human-in-the-loop responses and corrections for AI agent processes, etc., whether labeled or unlabeled, at 1410. In the case of generative AI models, which are often generally trained, the training process may be skipped unless fine-tuned models are desired, as discussed in more detail below. The AI/ML model is then trained over multiple epochs at 1420 and results are reviewed at 1430. While various types of AI/ML models may be used, LLMs and other generative AI models are typically trained (fine-tuned) using a process called "supervised learning", which is also discussed above. Supervised learning involves providing the model with a large dataset, which the model uses to learn the relationships between the inputs and outputs. During the training process, the model adjusts the weights and biases of the neurons in the neural network to minimize the difference between the predicted outputs and the actual outputs in the training dataset.

One aspect of the models in some embodiments is the use of transfer learning. For instance, transfer learning may take advantage of a pretrained model, such as ChatGPT, which is fine-tuned on a specific task or domain in step 1420. This allows the model to leverage the knowledge already learned from the pretraining phase and adapt it to a specific application via the training phase of step 1420.

The pretraining phase involves training the model on an initial set of training data that may be more general. During this phase, the model learns relationships in the data. In the fine-tuning phase (e.g., performed during step 1420 in addition to or in lieu of the initial training phase in some embodiments if a pretrained model is used as the initial basis for the final model), the pretrained model is adapted to a specific task or domain by training the model on a smaller dataset that is specific to the task. For instance, in some embodiments, the model may be focused on certain types(s) of data sources. This may help the model to more accurately identify data elements therein than a generative AI model that is pretrained alone. Fine-tuning allows the model to learn the nuances of the source, such as the specific vocabulary and syntax, certain graphical characteristics, certain data formats, etc., without requiring as much data as would be necessary to train the model from scratch. By leveraging the knowledge learned in the pretraining phase, the fine-tuned model can achieve state-of-the-art performance on specific tasks with relatively little additional training data.

If the AI/ML model fails to meet a desired confidence threshold at 1440 in some embodiments, the training data is supplemented and/or the reward function is modified to help the AI/ML model achieve its objectives better at 1450 and the process returns to step 1420. If the AI/ML model meets the confidence threshold at 1440, the AI/ML model is tested on evaluation data at 1460 to ensure that the AI/ML model generalizes well and that the AI/ML model is not over fit with respect to the training data. The evaluation data includes information that the AI/ML model has not processed before. If the confidence threshold is met at 1470 for the evaluation data, the AI/ML model is deployed at 1480. If not, the process returns to step 1450 and the AI/ML model is trained further.

Figure 15:
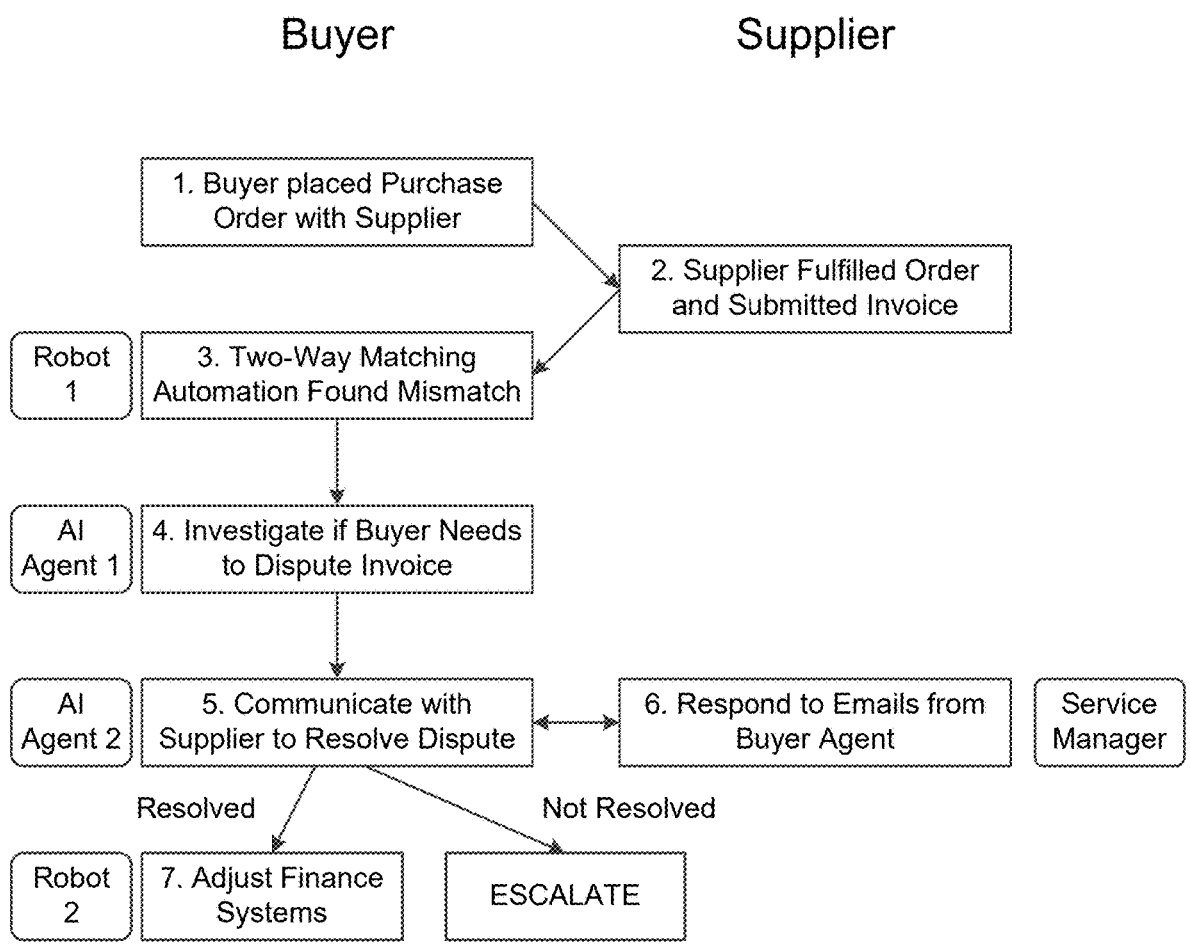
FIG. 15 illustrates an example invoice dispute resolution scenario, according to an embodiment of the present invention.

Various applications may benefit from unified AI agents and RPA, including, but not limited to, invoice dispute resolution, invoice processing, bank loan application processing, resolving technical specification discrepancies, resolving discrepancies between a product that was ordered and a product that was received, etc. For instance, in the case of invoice dispute resolution, RPA robots and AI agents may work together to address the problem. FIG. 15 illustrates an example invoice dispute resolution scenario 1500, according to an embodiment of the present invention. In this scenario, a buyer places a purchase order with a supplier, who then fulfills the order and submits an invoice to the buyer. It should be noted that such processes may be part of an AOP or performed by AI agent(s) and/or RPA robots themselves. A first RPA robot performs two-way matching, however, and finds a mismatch between the purchase order and the invoice. The first RPA robot then triggers a first AI agent (a dispute investigation agent) that has to investigate whether the buyer needs to dispute the invoice (e.g., via a conductor application or by sending a direct communication to the AI agent). The first AI agent determines that this is the case and triggers a second AI agent that has been trained to communicate with suppliers and uses information provided by the first AI agent to communicate via email with a service manager of the supplier and attempt to resolve the dispute. If the second AI agent is able to resolve the dispute, it triggers a second RPA robot that adjusts the finance systems of the buyer accordingly. If not, the second RPA robot escalates the dispute to a human.

In some embodiments, rather than being trained before being introduced into the production environment, the AI agent(s) are initially 100% reliant on human-in-the-loop. As the AI agent processes human responses, it learns to improve and become more autonomous over time. As such, as the AI agent learns to address more and more scenarios, the AI agent will seek to autonomously and dynamically select and implement solutions using the multiple tools at its disposal. As such, agentic automation is the combination of AI, automation, and orchestration. Agentic automation gives AI agents the power to plan, work, and make decisions with minimal human oversight once sufficiently trained.

Figure 16:
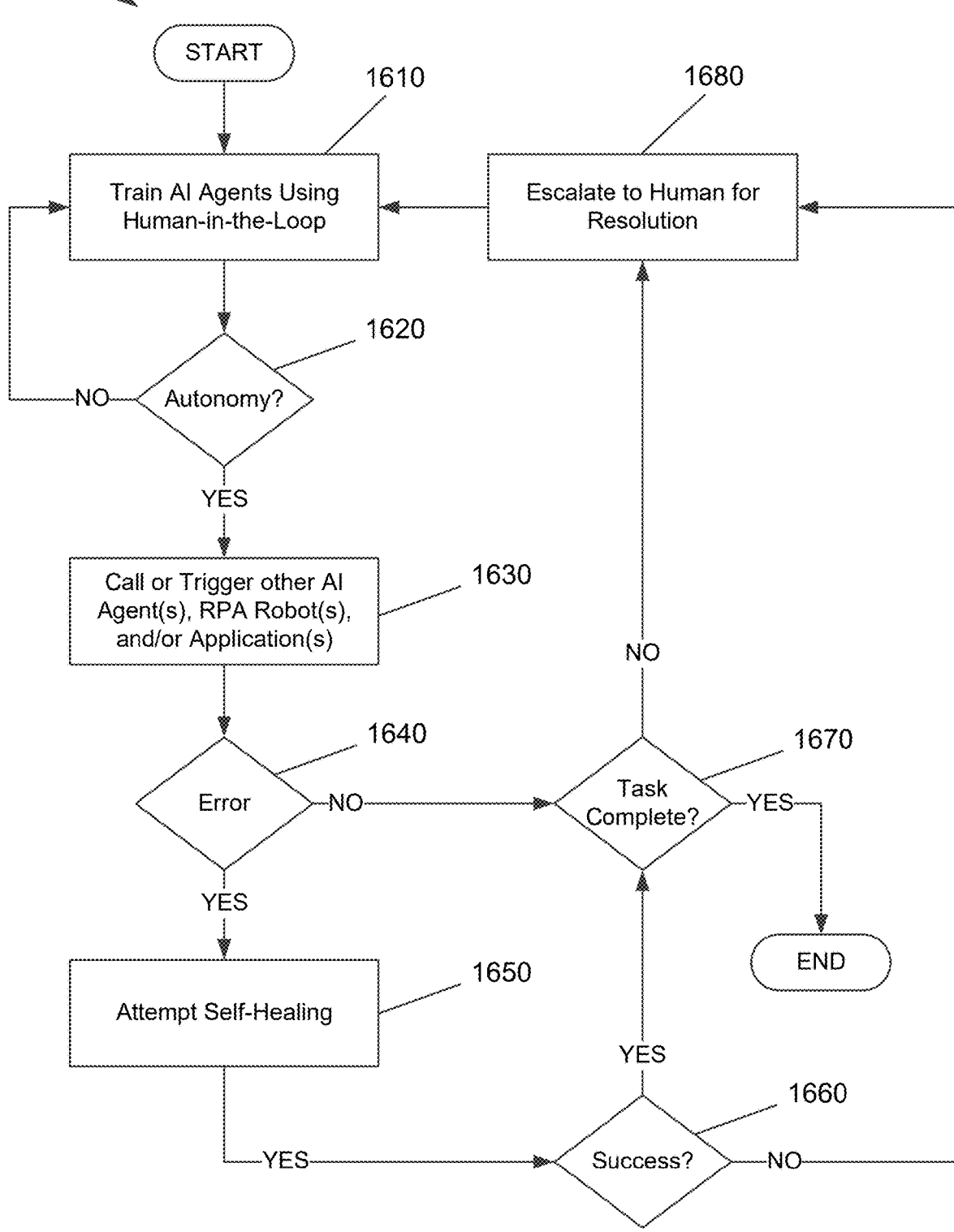
FIG. 16 is a flowchart illustrating a process for performing agentic automation and RPA with self-healing and capabilities to increase autonomy, according to an embodiment of the present invention.

FIG. 16 is a flowchart illustrating a process 1600 for performing agentic automation and RPA with self-healing and capabilities to increase autonomy, according to an embodiment of the present invention. The process begins with training AI agents using human-in-the-loop techniques at 1610. Per the above, AI agents may have agentic memory that evolves and remembers user interactions, feedback, corrections, and solutions (e.g., dynamic user inputs from human-in-the-loop operations). As the agentic memory grows, the AI agent can become increasingly autonomous, reducing the need for dynamic direct human inputs and improving efficiency. AI agents may also learn to be more efficient based on the agentic memory if more efficient solutions are contained therein or derived therefrom. For instance, AI agents may periodically process the agentic memory to analyze patterns to achieve greater autonomy.

If the AI agents have achieved sufficient autonomy at 1620 (e.g., as defined by some metric, such as a confidence score, a percentage of natural language requests that they can successfully process, either of these pertinent to success rate in a certain field or industry, etc.), the AI agents autonomously and dynamically call or trigger other AI agent(s), RPA robot(s), and/or application(s) to attempt to achieve their tasks at 1630. If not, training continues at 1610 until sufficient autonomy is achieved (e.g., the AI agents learn to address a certain number of issues, achieve certain minimum confidence scores, etc.).

In some embodiments, process 1600 may be facilitated by a conductor application. In certain embodiments, a business process implemented by the AI agent(s), RPA robot(s), and/or other application(s) may be executed as an AOP by an AOP engine and orchestrated via the conductor application. If an error occurs for a task that a given AI agent is attempting to achieve at 1640, the AI agent attempts a self-healing process to address the error at 1650. For instance, the developer of the AI agent automation may have specified self-healing mechanisms that the AI agent may employ, such as minimizing or maximizing windows, closing an application and opening a new instance thereof, emailing a different corporate contact, etc. If this is not successful at 1660, the AI agent escalates the issue to a human for resolution (e.g., an IT specialist, a customer support agent, an RPA developer, etc.). This may be done via an AI agent handler in some embodiments, which provides information pertaining to the error from the AI agent to the human-in-the-loop. For instance, the AI agent handler may be a desktop application interface or a web page that includes an agent question and a response for the human agent to provide. The human user can also choose to save this information in agentic memory in some embodiments so similar questions will likely not require human escalation.

In some embodiments, AI agents may share agentic memory with another AI agent, multiple or many AI agents, AI agents from the same agent deployment, AI agents for an industry or organization, all AI agents (i.e., global agentic memory), etc. This may help agents to perform a specific task very well based on their own agent-specific memory, as well as have a broader agentic memory base that they can use. This may be useful in some cases if the AI agent-specific memory fails to yield a solution.

If the self-healing was successful at 1660 or no errors occurred at 1640, if the AI agent is able to complete the task at 1670, the process ends. If not, the AI agent escalates to a human for resolution at 1680 (e.g., via an AI agent handler). Information pertaining to the incomplete task, such as actions taken by the AI agent, log traces, computing system state information, responses from third party employees, the resolution performed by the human, etc. is then used for further training (e.g., fine tuning) and the process returns to step 1610.

Figure 17:
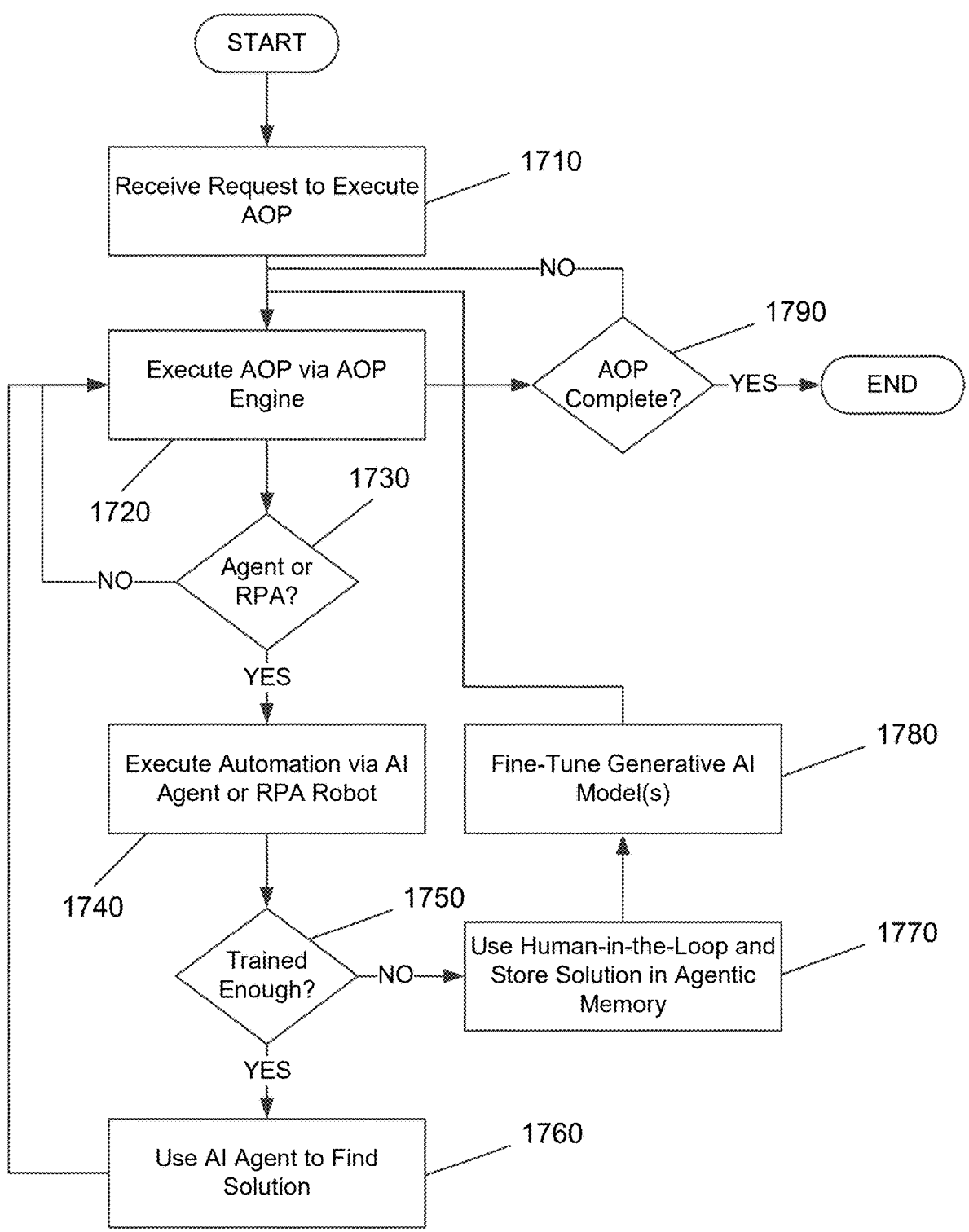
FIG. 17 is a flowchart illustrating a process for performing agentic automation and RPA, according to an embodiment of the present invention.

FIG. 17 is a flowchart illustrating a process 1700 for performing agentic automation and RPA, according to an embodiment of the present invention. The process beings with a conductor application receiving a request to execute an AOP at 1710. The AP is then executed by an AOP engine responsive to a start job request form the conductor application at 1720.

If a given step in the AOP does not require an AI agent or RPA robot at 1730, execution of the AOP continues at 1720 unless the AOP is complete at 1790, in which case the process ends. However, if a request is received by the conductor application from the AOP engine to execute an automation for a step of the AOP via an AI agent or RPA robot, the conductor application executes the automation via the AI agent or the RPA robot at 1740 via a start job request. If an RPA robot executes the automation, steps 1750 and 1760 are skipped, and the process proceeds to step 1720 after the automation is completed if the automation was successful. If not, assistance may be requested from a human or an AI agent.

If the automation is performed by an AI agent at 1740, if the AI agent is sufficiently trained (e.g., one or more generative AI models called by the AI agent have been fine-tuned to meet or exceed one or more metrics), the AI agent is used to find a solution at 1760 via the generative AI model(s). However, if the AI agent is not sufficiently trained (e.g., initially or otherwise early on in the agentic AI process where sufficient agentic memory content is not available), a human-in-the-loop approach is used to obtain human-generated solutions, which are stored in agentic memory. In some embodiments, this includes requesting assistance from a human-in-the-loop in resolving a natural language request associated with the automation via a human-in-the-loop call (e.g., the AI agent making a call to a software application via an API or some other mechanism to facilitate a human response), receiving a response from the human-in-the-loop, providing the response from the human-in-the-loop as output, and storing the response from the human-in-the-loop in agentic memory (e.g., by the AI agent or another software process). The generative AI model(s) used by the AI agent are subsequently fine-tuned at 1780 using this information and other human-generated solutions stored in agentic memory. It should also be noted that self-healing may be attempted as the need arises throughout the process as shown in FIG. 16. This self-healing may include searching an agentic memory, searching an execution context, searching a context associated with a different industry or organization, or any combination thereof, and responsive to the search, outputting a result.

In some embodiments, the AI agent may determine that another AI agent or an RPA robot should be used by the automation, and the AI agent facilitates this via the conductor application. Similarly, the RPA robot may determine that another RPA robot or an AI agent should be used for its automation, and this is facilitated via the conductor application in a similar manner. This may be accomplished by searching a database for AI agents and/or RPA robots that can assist with the automation. The database may include natural language descriptions of tasks that AI agents perform in some embodiments. With respect to RPA robots, the AI agent(s) that the RPA robot is to use are included in one or more activities of the RPA workflow of the RPA robot. The AI agent or RPA robot use the execution results therefrom for the automation.

The process steps performed in FIGS. 14, 16, and 17 may be performed by a computer program, encoding instructions for the processor(s) to perform at least part of the process(es) described in FIGS. 14, 16, and 17, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 1110 of computing system 1100 of FIG. 11) to implement all or part of the process steps described in FIGS. 14, 16, and 17, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
receiving a request to execute an agentic automation process (AOP), by a conductor application;
starting a job for an AOP engine to execute the AOP, by the conductor application;
receiving a request from the AOP engine to execute an automation for a step of the AOP via an artificial intelligence (AI) agent or a robotic process automation (RPA) robot, by the conductor application;
starting a job for the requested AI agent or RPA robot, by the conductor application;
receiving an indication from the AI agent or RPA robot that the execution of the automation was successful or failed, by the conductor application; and
informing the AOP engine that the execution of the automation was successful or failed, by the conductor application, wherein
the conductor application orchestrates the AOP engine and the RPA robot or AI agent.

2. The computer-implemented method of claim 1, further comprising:
responsive to the execution of the automation being successful, continuing to facilitate execution of the AOP, by the conductor application, until the AOP is completed.

3. The computer-implemented method of claim 1, wherein
the AI agent determines that another AI agent the RPA robot, or another RPA robot should be used for the automation, or the RPA robot determines that the AI agent or another AI agent should be used for the automation,
the other AI agent, the RPA robot, or the other RPA robot executes a portion of the automation of the AI agent, or the AI agent or the other AI agent executes a portion of the automation of the RPA robot,
the AI agent receives execution results from the other AI agent, the RPA robot, or the other RPA robot, or the RPA robot receive execution results from the AI agent or the other AI agent, and
by the first AI agent or the first RPA robot continues execution of the automation using the execution results.

4. The computer-implemented method of claim 3, wherein the determining step is performed by the AI agent and the determining step comprises searching a database, by the agent, for AI agents and/or RPA robots that can assist with the automation, the database comprising natural language description of tasks that the AI agents perform.

5. The computer-implemented method of claim 3, wherein the determining step is performed by the RPA robot and the determining step comprises searching a database, by the RPA robot, for AI agents that can assist with the automation.

6. The computer-implemented method of claim 3, wherein the determining step is performed by the RPA robot and the determining step comprises determining to use the AI agent or the other AI agent based on one or more activities in an RPA workflow of the RPA robot.

7. The computer-implemented method of claim 3, wherein responsive to the AI agent experiencing an error or failing to find a result, the one or more computer programs are further configured to cause the at least one processor to:
searching an agentic memory, searching an execution context, searching a context associated with a different industry or organization, or any combination thereof, by the AI agent; and responsive to the search, outputting a result, by the AI agent.

8. The computer-implemented method of claim 3, wherein initially, the method comprises:
requesting assistance from a human-in-the-loop in resolving a natural language request associated with the automation via a human-in-the-loop call, by the AI agent;
receiving a response from the human-in-the-loop, by the AI agent;
providing the response from the human-in-the-loop as output, by the AI agent; and
storing the response from the human-in-the-loop in agentic memory of the AI agent.

9. The computer-implemented method of claim 8, further comprising:
fine-tuning one or more generative AI models using the response from the human-in-the-loop and responses from other humans in the loop and/or log traces, computing system state information, responses from third party employees, or a combination thereof;
determining whether the AI agent has achieved sufficient autonomy as defined by one or more metrics to operate autonomously; and
using the AI agent instead of the human-in-the-loop responsive to meeting or exceeding the one or more metrics.

10. One or more computing systems, comprising:
memory storing computer program instructions for a conductor application; and
at least one processor configured to execute the stored computer program instructions, wherein the computer program instructions are configured to cause the at least one processor to:
start a job for an agentic orchestration process (AOP) engine to execute an AOP, by the conductor application,
receive a request from the AOP engine to execute an automation for a step of the AOP via an artificial intelligence (AI) agent or a robotic process automation (RPA) robot, by the conductor application,
start a job for the requested AI agent or RPA robot, by the conductor application,
receive an indication from the AI agent or RPA robot that the execution of the automation was successful or failed, by the conductor application, and
inform the AOP engine that the execution of the automation was successful or failed, by the conductor application, wherein
the conductor application orchestrates the AOP engine and the RPA robot or AI agent.

11. The one or more computing systems of claim 10, wherein the computer program instructions are further configured to cause the at least one processor to:
responsive to the execution of the automation being successful, continue to facilitate execution of the AOP until the AOP is completed.

12. The one or more computing systems of claim 10, wherein
the AI agent determines that another AI agent the RPA robot, or another RPA robot should be used for the automation, or the RPA robot determines that the AI agent or another AI agent should be used for the automation,
the other AI agent, the RPA robot, or the other RPA robot executes a portion of the automation of the AI agent, or the AI agent or the other AI agent executes a portion of the automation of the RPA robot,
the AI agent receives execution results from the other AI agent, the RPA robot, or the other RPA robot, or the RPA robot receive execution results from the AI agent or the other AI agent, and
by the first AI agent or the first RPA robot continues execution of the automation using the execution results.

13. The one or more computing systems of claim 12, wherein
the determining step is performed by the AI agent and the determining step comprises searching a database, by the agent, for AI agents and/or RPA robots that can assist with the automation, the database comprising natural language description of tasks that the AI agents perform, or
the determining step is performed by the RPA robot and the determining step comprises searching a database, by the RPA robot, for AI agents that can assist with the automation.

14. The one or more computing systems of claim 10, wherein responsive to the AI agent experiencing an error or failing to find a result, the computer program instructions are further configured to cause the at least one processor to:
search an agentic memory, search an execution context, search a context associated with a different industry or organization, or any combination thereof, by the AI agent; and
responsive to the search, output a result, by the AI agent.

15. The one or more computing systems of claim 10, wherein initially, the computer program instructions are configured to cause the at least one processor to:
request assistance from a human-in-the-loop in resolving a natural language request associated with the automation via a human-in-the-loop call, by the AI agent;
receive a response from the human-in-the-loop, by the AI agent;
provide the response from the human-in-the-loop as output, by the AI agent; and
store the response from the human-in-the-loop in agentic memory of the AI agent.

16. The one or more computing systems of claim 15, wherein the computer program instructions are configured to cause the at least one processor to:
fine-tune one or more generative AI models using the response from the human-in-the-loop and responses from other humans in the loop and/or log traces, computing system state information, responses from third party employees, or a combination thereof;
determine whether the AI agent has achieved sufficient autonomy as defined by one or more metrics to operate autonomously; and
use the AI agent instead of the human-in-the-loop responsive to meeting or exceeding the one or more metrics.

17. One or more non-transitory computer-readable media storing one or more computer programs for a conductor application, the one or more computer programs configured to cause at least one processor to:
start a job for an agentic orchestration process (AOP) engine to execute an AOP, by the conductor application,
receive a request from the AOP engine to execute an automation for a step of the AOP via an artificial intelligence (AI) agent or a robotic process automation (RPA) robot, by the conductor application,
start a job for the requested AI agent or RPA robot, by the conductor application, receive an indication from the AI agent or RPA robot that the execution of the automation was successful or failed, by the conductor application, and inform the AOP engine that the execution of the automation was successful or failed, by the conductor application, wherein the conductor application orchestrates the AOP engine and the RPA robot or AI agent.

18. The one or more non-transitory computer-readable media of claim 17, wherein the one or more computer programs are further configured to cause the at least one processor to:

responsive to the execution of the automation or the other automation being successful, continue to facilitate execution of the AOP, by the conductor application, until the AOP is completed.

19. The one or more non-transitory computer-readable media of claim 17, wherein the AI agent determines that another AI agent, the RPA robot, or another RPA robot should be used for the automation or the other automation, or the RPA robot determines that the AI agent or another AI agent should be used for the automation or the other automation, the other AI agent, the RPA robot, or the other RPA robot executes a portion of the automation or the other automation of the AI agent, or the AI agent or the other AI agent executes a portion of the automation or the other automation of the RPA robot, the AI agent receives execution results from the other AI agent, the RPA robot, or the other RPA robot, or the RPA robot receive execution results from the AI agent or the other AI agent, and by the first AI agent or the first RPA robot continues execution of the automation or the other automation using the execution results.

20. The one or more non-transitory computer-readable media of claim 19, wherein the determining step is performed by the AI agent and the determining step comprises searching a database, by the AI agent, for AI agents and/or RPA robots that can assist with the automation, the database comprising natural language description of tasks that the AI agents perform.

21. The one or more non-transitory computer-readable media of claim 19, wherein the determining step is performed by the RPA robot and the determining step comprises searching a database, by the RPA robot, for AI agents that can assist with the automation.

22. The one or more non-transitory computer-readable media of claim 19, wherein the determining step is performed by the RPA robot and the determining step comprises determining to use the AI agent or the other AI agent based on one or more activities in an RPA workflow of the RPA robot.

23. The one or more non-transitory computer-readable media of claim 19, wherein responsive to the AI agent experiencing an error or failing to find a result, the one or more computer programs are further configured to cause the at least one processor to:

search an agentic memory, search an execution context, search a context associated with a different industry or organization, or any combination thereof, by the AI agent; and responsive to the search, output a result, by the AI agent.

24. The one or more non-transitory computer-readable media of claim 19, wherein initially, the one or more computer programs are configured to cause the at least one processor to:

request assistance from a human-in-the-loop in resolving a natural language request associated with the automation via a human-in-the-loop call, by the AI agent;

receive a response from the human-in-the-loop, by the AI agent;

provide the response from the human-in-the-loop as output, by the AI agent; and store the response from the human-in-the-loop in agentic memory of the AI agent.

25. The one or more non-transitory computer-readable media of claim 24, wherein the one or more computer programs are further configured to cause the at least one processor to:

fine-tune one or more generative AI models using the response from the human-in-the-loop and responses from other humans in the loop and/or log traces, computing system state information, responses from third party employees, or a combination thereof;

determine whether the AI agent has achieved sufficient autonomy as defined by one or more metrics to operate autonomously; and use the AI agent instead of the human-in-the-loop responsive to meeting or exceeding the one or more metrics.

* * * * *